US009716428B2

(12) United States Patent
Barthold et al.

(10) Patent No.: US 9,716,428 B2
(45) Date of Patent: Jul. 25, 2017

(54) HIGH VOLTAGE CAPACITIVE POWER TRANSFORMER

(76) Inventors: Lionel O. Barthold, Lake George, NY (US); Dennis A. Woodford, Winnipeg (CA)

(*) Notice: Subject to any disclaimer, the term of this patent is extended or adjusted under 35 U.S.C. 154(b) by 1039 days.

(21) Appl. No.: 13/114,414

(22) Filed: May 24, 2011

(65) Prior Publication Data
US 2011/0292687 A1    Dec. 1, 2011

Related U.S. Application Data

(60) Provisional application No. 61/348,337, filed on May 26, 2010.

(51) Int. Cl.
*H02M 3/07*     (2006.01)
*H02M 7/49*     (2007.01)

(52) U.S. Cl.
CPC .............. *H02M 3/07* (2013.01); *H02M 7/49* (2013.01); *H02M 2003/071* (2013.01)

(58) Field of Classification Search
CPC . Y02T 10/7005; Y02T 10/7077; B60R 16/03; B60R 16/0315; B60R 21/017; B60L 11/14; H02J 7/1438; H02M 3/22; H02M 3/07; H02M 7/49; H02M 3/18; G01R 15/14; H03K 3/53
USPC .......................................................... 363/27
See application file for complete search history.

(56) References Cited

U.S. PATENT DOCUMENTS

| | | | |
|---|---|---|---|
| 5,270,913 A * | 12/1993 | Limpaecher | .................. 363/140 |
| 5,311,418 A | 5/1994 | Lalander | |
| 6,008,548 A * | 12/1999 | Fenner et al. | ................. 307/105 |
| 6,865,417 B2 * | 3/2005 | Rissmann et al. | ................. 607/5 |
| 7,570,033 B1 | 8/2009 | Ju | |
| 7,605,641 B2 | 10/2009 | Negoi | |
| 7,616,459 B2 | 11/2009 | Huynh et al. | |
| 7,626,445 B2 | 12/2009 | Lesso et al. | |
| 7,808,302 B2 | 10/2010 | Xu et al. | |
| 7,948,301 B2 | 5/2011 | Cook et al. | |
| 2007/0211503 A1* | 9/2007 | Oyama et al. | .................. 363/62 |
| 2008/0054327 A1* | 3/2008 | Johnson | ........................ 257/301 |
| 2008/0150620 A1 | 6/2008 | Lesso | |
| 2009/0066407 A1 | 3/2009 | Bowman et al. | |

(Continued)

FOREIGN PATENT DOCUMENTS

| | | |
|---|---|---|
| JP | 2005-278295 | 10/2005 |
| JP | 2008-271471 | 11/2008 |

OTHER PUBLICATIONS

Chang, Yuen-Haw, et al; Int'l MultiConference of Engineers and Computer Scientists; Mar. 17-19, 2010; ISBN-13:9789881701282; pp. 1290-1295; pub by. Newswood, Ltd.

(Continued)

*Primary Examiner* — Rexford Barnie
*Assistant Examiner* — Terrence Willoughby
(74) *Attorney, Agent, or Firm* — Brian M. Dingman; Dingman IP Law, PC

(57) ABSTRACT

A high voltage transformer for transforming electric power from a high voltage direct current source to a lower voltage direct current or to a lower voltage alternating current, without intermediate magnetic transformation. The transformer has a number of stages. Each stage includes capacitors and switching devices. There is a controller that controls the switching devices to change the polarity of one or more capacitors.

19 Claims, 23 Drawing Sheets

(56) References Cited

U.S. PATENT DOCUMENTS

2010/0026264 A1* 2/2010 Ben-Yaakov et al. ........ 323/283
2010/0225278 A1 9/2010 Reefman et al.

OTHER PUBLICATIONS

Nomura, Hiroshi; et al; 37th IEEE Power Electronics Specialists Conf; Jun. 18-22, 2006; ISBN-13:9780780397163, Article No. 1712228; Inst. Electrical and Electronics Engineers.
Deleage, Olivier, et al; 2009 IEEE Energy Conversion Congress and Exposition; Sep. 20-24, 2009; ISBN-13:9781424428939, Article No. 5316330; pub. by IEEE Computer Society.
Bhattacharyya, K., et al; 21st Int'l Conf. on VLSI Design; Jan. 4-8, 2008; ISBN-13:9780769530833; pub. by IEEE Computer Society.
Yang, Yu-jia, et al; Journal of Fudan University (Natural Science) vol. 45; No. 4, pp. 426-430, Aug. 2006; ISSN: 04277104; pub. by Fudan University Press (China).
Liu, Jian, et al; IEEE Region 10 Annual Int'l. Conf. Microelectronics and VLSI; Nov. 6-10, 1995; TENCON, pp. 327-330; 1995; pub. by IEEE.
Karady, George G., et al; American Power Conf; vol. 1; pp. 104-109, 1998; ISSN: 00972126; pub. by Illinois Inst. of Technology.
Beck, Yuval, et al; IEEE Transactions on Circuits and Systems I: Regular Papers; vol. 5, pp. 51-61, 2011; ISSN: 15498328, pub. by Inst. of Electrical and Electronics Engineer.
Keiser, O, et al; Power Electronics Specialists Conf. 2008; Jun. 15-18, 2008, p. 2772, ISBN: 9781424416677; pub. by. IEEE.

* cited by examiner

Figure 23

| Capacitor Orientation | Switch | | | |
|---|---|---|---|---|
| | 1 | 2 | 3 | 4 |
| Normal | X | O | O | X |
| Reversed | O | X | X | O |

Figure 24

| Capacitors Connection | Switch | | |
|---|---|---|---|
| | 1 | 2 | 3 |
| Series | O | X | O |
| Parallel | X | O | X |

HIGH VOLTAGE CAPACITIVE POWER TRANSFORMER

CROSS REFERENCE TO RELATED APPLICATION

This application claims priority of provisional application Ser. No. 61/348,337 filed on May 26, 2010, the entire contents of which are incorporated herein by reference.

FIELD

This disclosure pertains to conversion of electric power from a higher dc voltage to a lower dc voltage or ac voltage without the use of magnetically-based transformers.

BACKGROUND

Electric power is often transformed from high voltage (hundreds of kilovolts) ac to high voltage (hundreds of kilovolts) dc in order to achieve more efficient long distance transmission of electric power and to achieve other network-related operational advantages. In such cases it is then transformed back to high voltage ac at the receiving substation where it is subsequently coupled by transformer into the ac grid. Usefulness of high voltage dc is limited largely by the cost of the ac-to-dc and dc-to-ac converter stations. The cost of those stations benefit from economies of scale, the lowest cost per kilowatt is achieved by stations designed for very high power levels at very high voltages. Because stations which convert small amounts of power at very high voltage are extremely expensive, it is impractical to "tap" long distance high voltage dc lines to supply small intermediate loads.

Unlike transformation between ac and dc at household voltages where insulation between circuit components is a minor cost and rating-availability consideration, insulation of components within equipment designed for hundreds of kilovolts, both between components and from components to ground is a major expense and rating constraint; thus the need for a new approach adaptable to very high voltage equipment and supporting insulation.

DESCRIPTION OF PRIOR ART

Prior art with respect to dc-to-dc transformation at high transmission voltage levels is exceedingly sparse. U.S. Pat. No. 5,311,418 (4/1994) cites a method which uses full size bridges to convert first from one dc voltage to ac and then by use of an intermediary transformer, from ac to a different dc voltage level.

At utilization voltage levels, in contrast, there is wealth of prior art. "Switched-mode power supplies" (SMPS) now predominate, having largely replaced resistor-based ("linear") methods which are wasteful of power and generate heat. SMPSs are generally comprised of either non-isolated topologies or isolated topologies.

Non-isolated topologies consist largely of "buck-boost" schemes in which the magnetic field of a reactor is first built up by a current source, then caused to discharge resonantly with a capacitor, the latter conveying its energy to an electrical load. It is essentially a single stage device, i.e. there is no practical way of compounding buck-boost schemes into multiple stages. U.S. Pat. No. 7,570,033 (8/2009) is representative of recent buck-boost configurations.

Non-isolated topologies also include a wide array of devices generically known as "Charge Pumps." Charge pumps generally consist of periodically isolating and moving one or more charged capacitors from one portion of a circuit connection to another. U.S. Pat. Nos. 7,626,445 B2 and 7,605,641 B2 (10/2009) are representative of recent patents using charge pump methods. Classical charge pump designs transport a charged capacitor from one stage to the next. Classical charge pumps are driven by a fixed frequency.

With "isolated topologies," dc is generally achieved in four general stages: (1) conversion from of ac utilization voltage, e.g. 110 or 220 volts, to a dc voltage which, in the absence of the weight and size of a transformer, must be the same order of magnitude, (2) conversion from dc to a high frequency ac, e.g. 50 kH, (3) Step-down to a lower ac voltage, taking advantage of the smaller transformer size and cost made possible by the high frequency and finally, (4) conversion from lower voltage dc to the desired dc charging voltage. U.S. Pat. No. 7,616,459 (10/2009) is representative of recent patents based on isolated technology.

REVIEW OF PHYSICAL PRINCIPLES

The methods described herein and their proposed systems of implementation are based on commonly understood electrical principles and control approaches. The application of those principles to the invention will be aided by a brief review of the physics governing electrical charges within capacitors and the interaction of such charges with inductances. In this and subsequent discussions of dc-to-dc transformers (DCTs), switching operations will be described and depicted as though achieved by simple ideal switches recognizing that in practice such switching would be achieved by various power electronic devices, e.g. diodes, thyristors and IGBTs, all of which are well understood in structure and operation. They represent a broad field of prior art.

FIG. 1 shows a series of m capacitors 20, 21, 120, 220 and 221 connected in series across a dc power source 4 which puts the high voltage bus 7 at a positive potential above the ground plane 2. Distribution of the high voltage dc source voltage among capacitors 20 through 221 will depend on the capacitance of each and on prior charge history. Upon initial connection of the voltage source 4 to the capacitor chain 20 to 221, the latter having no prior charge, voltage distribution will be proportional to each capacitor's susceptance, i.e. inversely proportional to each capacitor's capacitance.

Suppose that capacitor $C_n$, 120 is disconnected from the series of FIG. 1, as shown by a partial depiction of FIG. 2a. Suppose further that the removed capacitor 120 is inverted as shown in FIG. 2b and then partially reconnected as shown if FIG. 2c. The voltage across the gap x and y will then equal $-2V_n$, and represents a "change" or "driving" voltage equal to the difference between $+V_n$ and $-V_n$. Closing the switch 9 in FIG. 2d will cause that driving voltage, $-2V_n$, to distribute itself over each of the capacitors in the series chain. That will, in turn, increase the voltage on each capacitor in the chain and draw energy from the high voltage supply system 4. The reversed capacitor, will, by virtue of reversal, have a negative voltage prior to re-insertion in the chain. That negative voltage will either become a lesser negative voltage or become positive as a result of reverse re-insertion, depending on circuit constants. This mechanism provides a means, developed in subsequent paragraphs, by which energy can be transferred from a high voltage source to a low voltage load.

Capacitor polarity reversal and its usefulness in transfer of energy between voltage levels can be achieved by other means as well. FIG. 3a shows the use of a reactor 25 for that purpose. In this case reversal can be initiated by closing switch 10, causing the oscillatory current and voltage wave shown in FIG. 3b. At 180 electrical degrees following switch-closing the current will go through zero allowing the switch 10 to be opened, leaving the capacitor 20 with its charge reversed in polarity. That change in voltage, as before, will cause the voltage of all other capacitors to increase.

In either of the above examples, action at one capacitor stage in FIG. 1 affects a redistribution of charge (and voltage) among the other stages without deliberate intervention at those other stages—an advantage of this disclosure and one that allows its extension to very high dc voltages.

FIG. 4 illustrates yet another means of achieving charge and voltage redistribution among a number of capacitors in series. In this case each capacitor function is represented by a module (e.g., module 64) consisting of two identical capacitors, a 120a and b 120b, initially connected in series. Any one of those capacitor pairs, e.g. $C_n$ 64 and could be switched from its series connection to a parallel connection, thus reducing the voltage across it by a factor of two and, according to the principle cited above, causing an increase in the voltage of other capacitors in the series chain 20b through 221a in FIG. 4.

Embodiments disclosed herein depend on charge and voltage redistribution caused throughout a series chain of capacitor modules by sequential and autonomous voltage change action with individual modules. While description of individual embodiments in succeeding paragraphs may be illustrated by means of a particular voltage reversal or voltage reduction principles, the methods inherent in those embodiments and the systems developed for implementation of those methods should be construed as embracing any of the above-cited means (and indeed any other means, whether presently existing or developed in the future) of individual capacitor or capacitor module voltage reversal or reduction, each of which means, taken individually and in elementary form, are known in the art.

SUMMARY

This disclosure pertains to conversion of electric power from a higher dc voltage to a lower dc voltage or lower ac voltage without the use of magnetically-based transformers. The disclosure draws on fundamental laws of energy interchange among capacitors and between capacitors and reactors and makes use of commonly applied electronic switching methods and devices. It will find application where it is useful to transform power from a high dc voltage to a lower dc voltage, for example where dc-to-ac conversion is cheaper per kW from a low dc voltage than from a high dc voltage. It will also find application for low or intermediate power level transformation from a higher dc voltage to a lower three-phase ac voltage. The disclosure provides an inexpensive intermediate dc-dc transformation which allows dc-to-ac conversion at a voltage level more economic for the level of power to be supplied.

Classical charge pump designs transport a charged capacitor from one stage to the next, whereas the disclosure uses changes within each of a series of stages to influence the voltage distribution among others, including the load stage. Classical charge pumps are driven by a fixed frequency, whereas switching frequency in the disclosure is in response to load demands.

A method and system of implementation for this disclosure, illustrated in FIG. 5, uses capacitive transfer principles illustrated in FIGS. 1 through 3 so as to create a step-down transformer. It does so by periodic and sequential changing of polarity, magnitude, or both on capacitors within each stage of a series of stages connected from the higher dc voltage bus to ground. In FIG. 5 reversal of polarity within each of the stages represented symbolically by capacitor $C_2$ 21 through $C_n$ 24 will affect the voltage across the capacitor 20 in the lowermost (load) stage and can be sequenced to replenish the charge in that capacitor 20 as it is periodically discharged through the load resistor 34 by closing of switch 10. The load, shown as a simple resistor 34 would in practice be either a low voltage dc load, a dc-to-ac converter or, as will be shown subsequently, an ac load itself. Several important observations can be made with respect the above switching and discharge steps:

1. By appropriate and repetitive sequence of switching operations it is possible to cause repetitive excursions of the load capacitor 20 voltage u above $u_0$, a control set point, thus providing a sustained basis for delivery of power to a dc load 34 in FIG. 5.
2. Because the capacitor reversal time can be very fast, the effectiveness of the disclosure is not materially affected if the load $R_L$ 34 is permanently connected to the load capacitor, 20, eliminating the switch 10.
3. Replacing the infinite source shown in FIG. 5 by a dc transmission line and its supply system through rigorous transient simulation, shows the results demonstrated theoretically on the idealized schematic of FIG. 5 to be realizable on an actual system.

This disclosure features a high voltage transformer for transforming electric power from a high voltage direct current source to a lower voltage direct current or to a lower voltage alternating current (ac) without intermediate magnetic transformation comprising a plurality of stages, wherein each stage comprises one or more capacitors and one or more switching devices. There is a controller that controls the switching devices to change the polarity of one or more capacitors.

The high voltage transformer may further comprise one or more voltage reversing reactors. The controller may cause a series of autonomous actions within individual stages so as to transform power from a high voltage direct current source to a lower voltage direct or time-varying current load. The series of autonomous actions may comprise switching actions, and the controller may cause the switching action within individual stages to be initiated at a time which causes the effect of that switching action to reduce the transient caused by one or more prior switching actions. Power from a high voltage direct current source may be transformed to a lower voltage direct or time-varying current load without causing the voltage within each stage to exceed a modest increase over the nominal and proportionate voltage rating of that stage compared to the sum of voltages for all stages. The voltage rating of equipment within each stage may be a small fraction of the high voltage source potential.

The switching devices may comprise power electronic switching apparatus within each stage, to temporarily disconnect one or more capacitors and reconnect them in a reverse polarity. Capacitor reversal may be achieved using an H bridge comprised of power electronic devices. The sequence of switching may be selected to cause a recurrent increase in a load capacitor above its nominal voltage, thus enabling repetitive discharge of that capacitor into an electrical load. The time of switching of an individual capacitor may be adjusted to cancel the harmonic oscillation caused by one or more prior switching actions.

One or more stages may comprise multiple capacitors, to allow partial and sequential charging and/or discharging of the stages. One or more stages may comprise multiple capacitors in parallel, each such capacitor switched into charging or discharging duty at a time and for a duration that controls the aggregate charging or discharging current profile. One or more stages may comprise multiple capacitors in series, each such capacitor either inserted in the series chain or isolated from that chain and bypassed within the chain, thereby controlling the number of capacitors in the series chain at times and for durations that control the aggregate charging or discharging current profile. Control of insertion or bypassing may be achieved by a three-quarters bridge comprised of three power electronic devices.

The lower voltage output may be caused to vary in time, describing a 1-sine ⊖ current wave shape. A number of dc transformers, that number being an integer multiple of three, may be connected in parallel and caused to generate 1-sine ⊖ current wave shapes which, by virtue of displacement of their relative electrical phase position, draw from the high voltage dc source an aggregate current which has essentially no sinusoidal content. The sine ⊖ component and the dc component of the 1-sine ⊖ current and voltage wave shapes may be separated from one another by use of a blocking capacitor or network serving the blocking function, thus isolating the ac component and allowing its supply to an ac bus bar either directly or through an intermediate magnetically-based transformer.

Also featured in the disclosure is a high voltage transformation system comprising a plurality of transformers of the type described herein, configured such that each one supplies one or more separate time-limited segments of a sinusoidal ac wave form. A transformer may be enabled to supply one or more time-limited segments of a sinusoidal ac wave form of opposite polarity by causing a capacitor or a fraction of a number of capacitors connected so as to comprise a composite capacitor, to be charged at a first polarity; then have its polarity temporarily reversed by switching actions for supply of power at a second polarity. One transformer may be caused to supply more than one segment, by adjusting its voltage level between the demands of various segments. By varying the time duration of various segments as well as their time-orientation on a sinusoidal ac wave form, the composite charging wave form may be adjusted to smooth the charging demands on the dc supply source and/or to replicate the ac sine wave segment supplied during the discharge interval. There may be n sets of transformers, the wave forms of each set being offset by 120/n electrical degrees. Such transformers may be arrayed to cause the ac outputs of each set to be added to that of all others on a phase-by-phase basis.

Further featured is a system for achieving dc-to-dc power conversion, comprising solid state valves designed for real and reactive power control, and complementary apparatus to achieve dc-to-dc power conversion without intermediate magnetic transformation.

BRIEF DESCRIPTION OF THE DRAWINGS

Other objects, features and advantages will occur to those skilled in the art from the following description of embodiments and the accompanying drawings.

FIG. 3b shows capacitor current and voltage resulting from the switching action of FIG. 3a.

FIG. 23 is a chart that illustrates the sequence which achieves normal and reversed connection as per the schematic shown in FIG. 6a.

FIG. 24 is a chart that illustrates the switch positions for the switches shown in FIGS. 9a and 9b.

DESCRIPTION OF EMBODIMENTS

Because useful application of the method inherent in the present dc-to-dc transformer and its embodiment into a system of components will involve high voltage sources in the hundreds of kilovolts, an advantage of this disclosure is the ability to keep the dc voltage drop and insulation requirements demanded by each capacitor stage within reasonable bounds. This can be achieved by affecting transfer of energy among capacitors by switching actions within rather than between capacitor stages. A large number of stages may therefore reduce the voltage rating of individual stages to relatively low values.

Figure 6A:
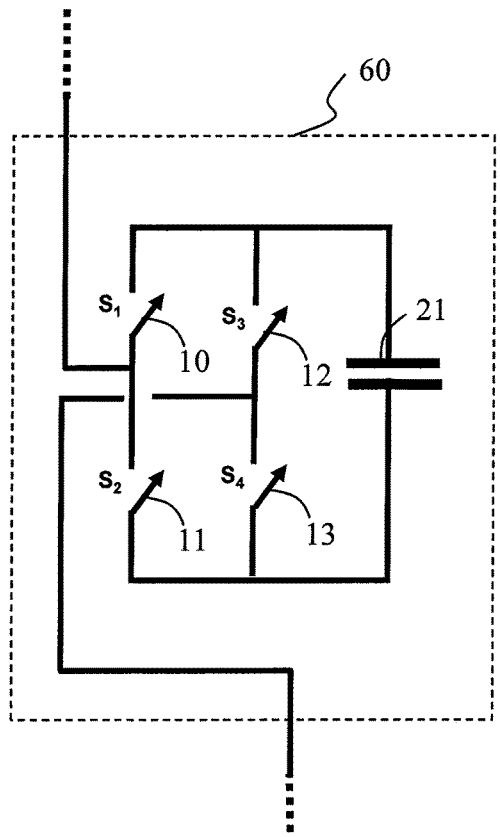
FIG. 6a shows an example schematic by which a capacitor can be reversed in polarity by switching operations.
Figure 6B:
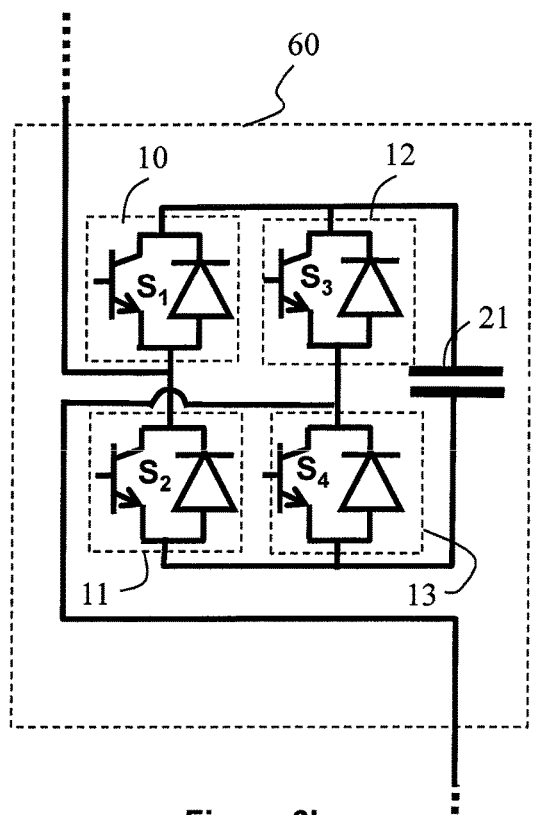
FIG. 6b shows an embodiment of the system of FIG. 6a in which capacitor reversal is achieved by power electronic devices comprising an "H bridge."

An embodiment achieves capacitor reversal by means of an "H bridge" shown in schematic format in FIG. 6a and as an example implementation by IGBTs in FIG. 6b. FIG. 23 is a chart that illustrates the sequence which achieves normal and reversed connection, X representing a switch closed position and O a switch open position.

Figure 7:
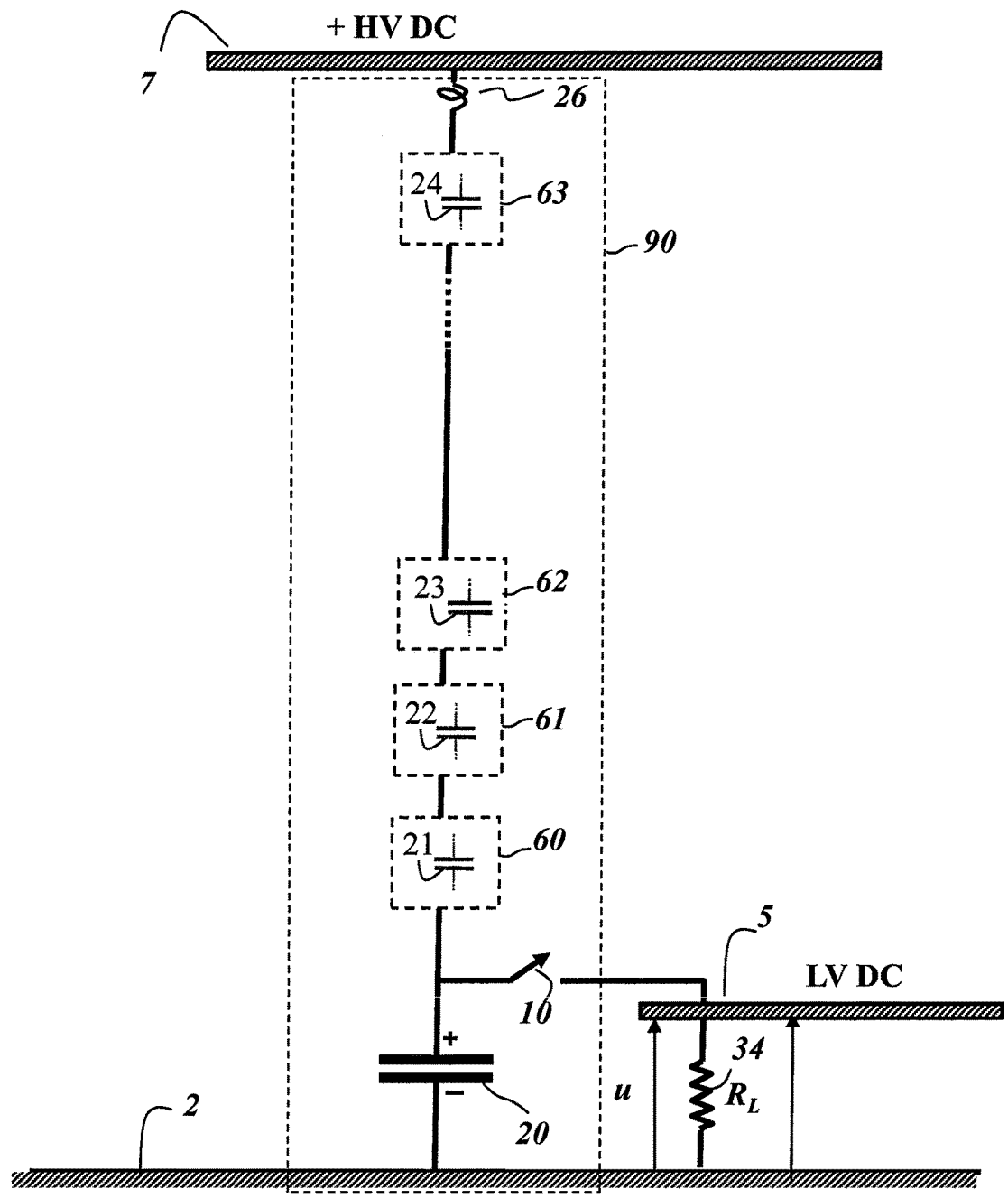
FIG. 7 shows a dc transformer in which each capacitor except the lower-most load capacitor is embedded into a module capable of sequentially reversing internal capacitor connection.

The capacitor 21 and switching devices 10, 11, 12 and 13 in FIGS. 6a and 6b constitute a type of module 60 which is represented as 60, 61, 62, and 63 in the composite dc transformer 90 illustrated in FIG. 7.

In the embodiment of FIG. 7 capacitors 21 through 24 embedded in their respective modules 60 through 63, the latter representing the uppermost of a larger number of stages, are reversed sequentially from uppermost 24 to lowermost 21 during which cycle previously reversed capacitors are later restored to their original polarity. The number of modules or "stages" can be arbitrarily chosen, more stages representing a smoother current wave form both at high and low voltages.

Performance of the DCT illustrated in FIG. 7 is dependent on relative values chosen for each capacitor in the series chain 21 through 24 and their ratio to the load capacitor 20. Capacitance values and the switching time chosen will determine MW rating as well as the maximum voltage rating required of power electronic switching devices 10, 11, 12, and 13 (FIG. 6) within each stage. It is possible to control the latter to less than 1.5 times the voltage on the high voltage bus divided by the number of stages—thus allowing transformation from a very high dc voltage while using only switching devices of modest voltage rating.

Figure 8:
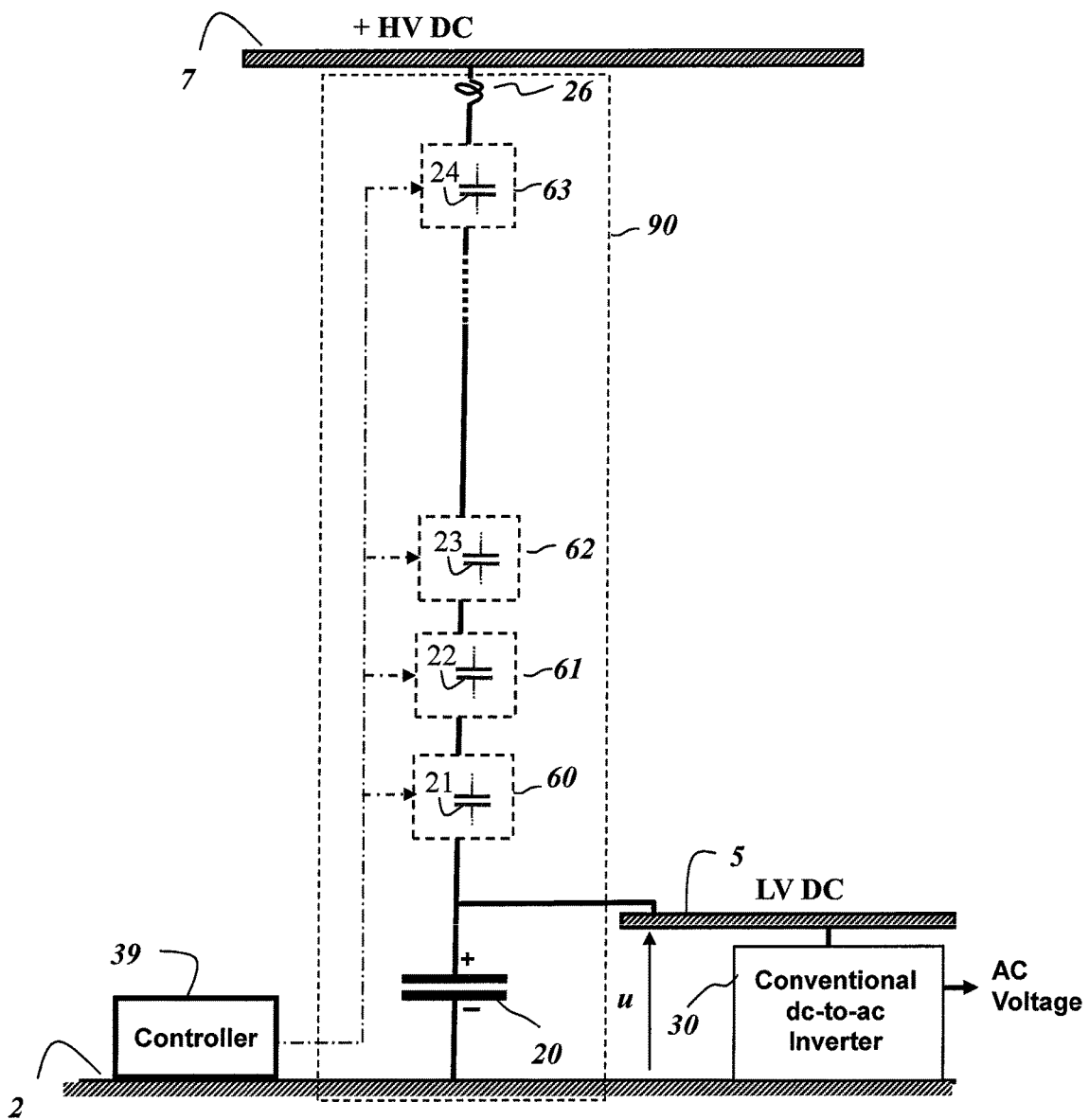
FIG. 8 shows the dc transformer of FIG. 7 in which dc load voltage is controlled to a specific level and used as a continuous power source for conversion to ac voltage.

While FIG. 7 shows the discharge of capacitor 20 into load 34 as intermittent and timed by closing and opening of a load switch 10 so as to produce a stable voltage on the low voltage dc bus 5, it will be clear to those versed in the art that this connection could be permanent as shown in FIG. 8 and, further that the resistive load 34 in FIG. 7 could be replaced by a conventional dc-to-ac inverter 30 as shown in FIG. 8.

Figure 1:
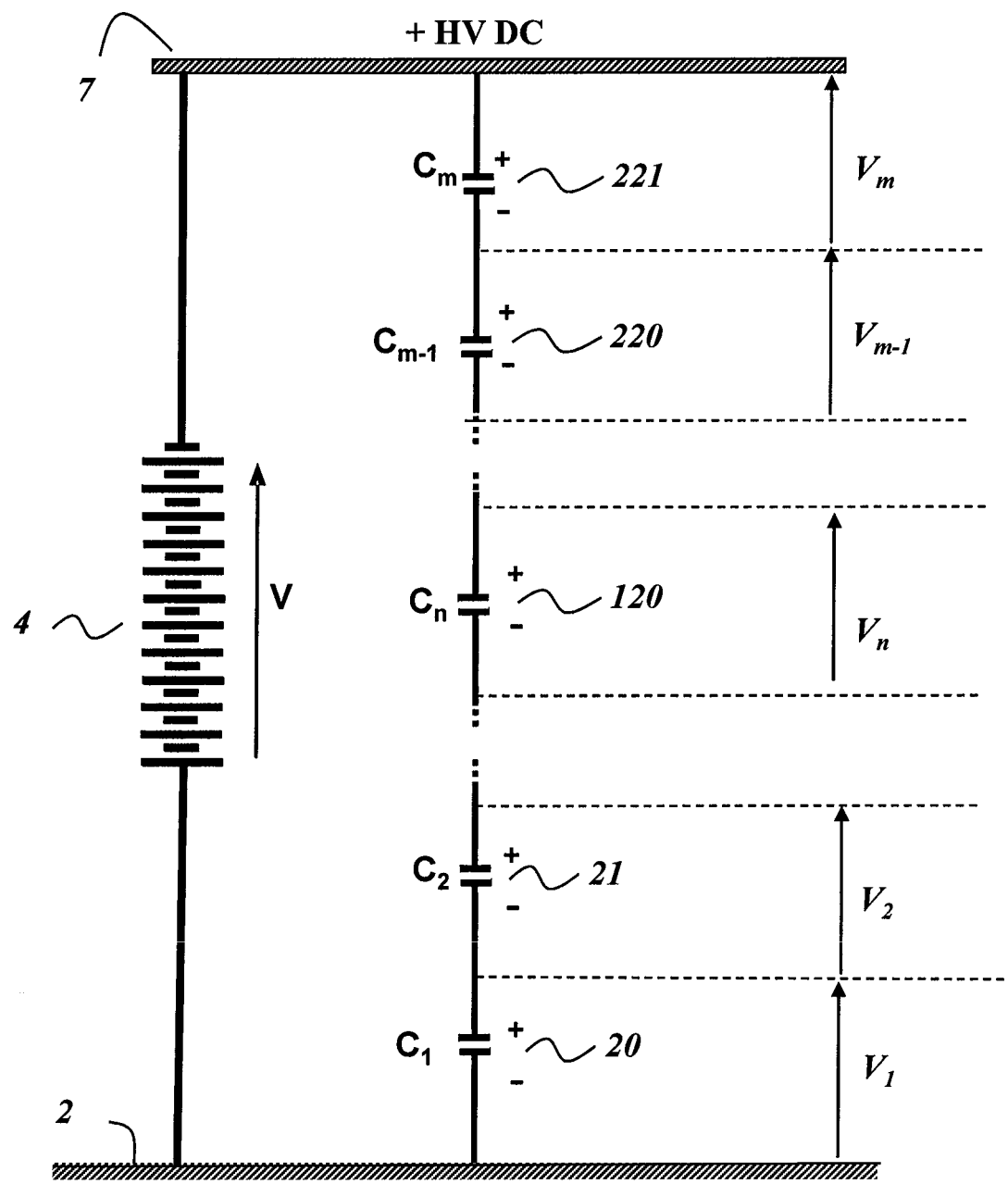
FIG. 1 shows a number of capacitors connected in series across a high voltage dc source.
Figure 2A:
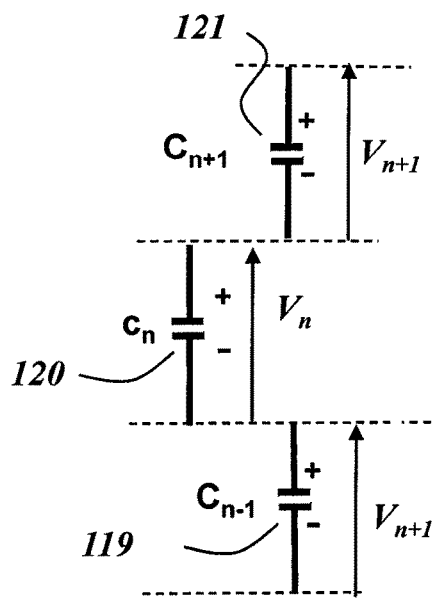
FIG. 2a shows one capacitor within a series chain of capacitors, removed from its series connection.
Figure 2B:
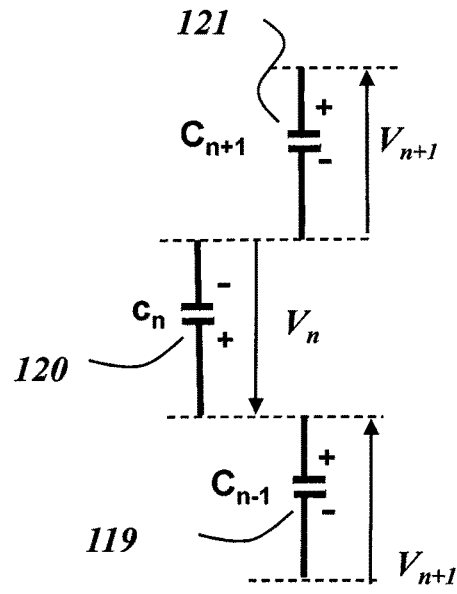
FIG. 2b shows the capacitor of FIG. 2a reversed in polarity or connection orientation.
Figure 2C:
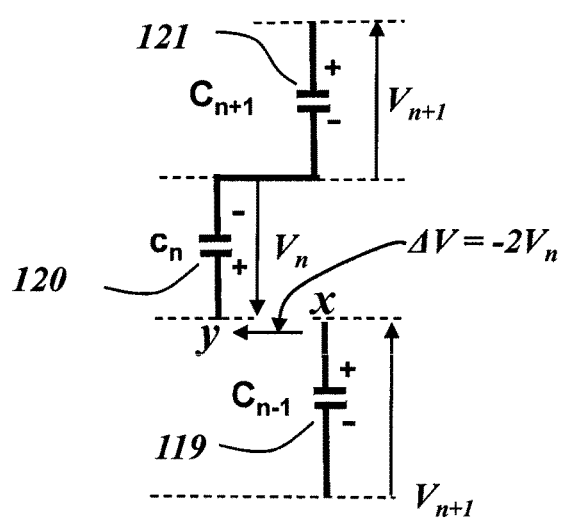
FIG. 2c shows the voltage appearing across the open series connection prior to re-insertion of a capacitor into the series chain.
Figure 2D:
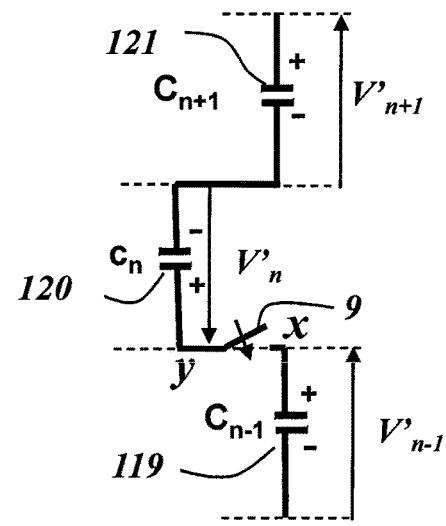
FIG. 2d shows the reversed capacitor being connected back into the series chain at its uppermost (now negative) end only.
Figure 3A:
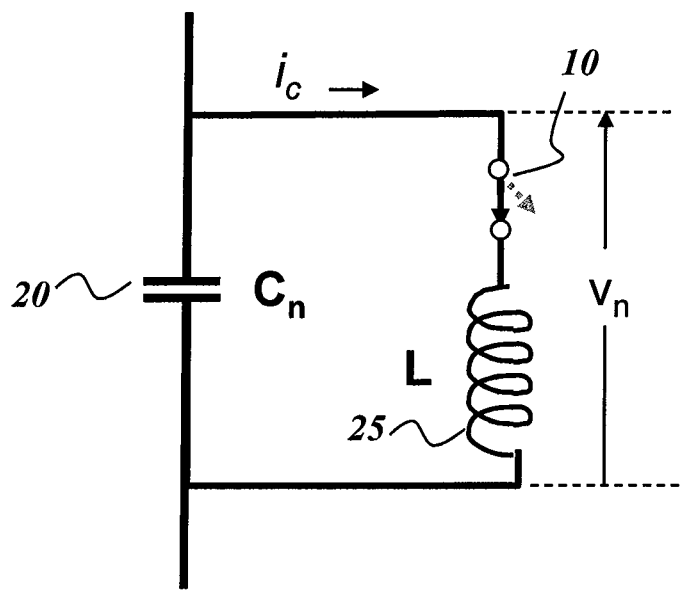
FIG. 3a shows an alternative means of capacitor polarity reversal using a parallel inductance, a switching action, and a resonant response.
Figure 3B:
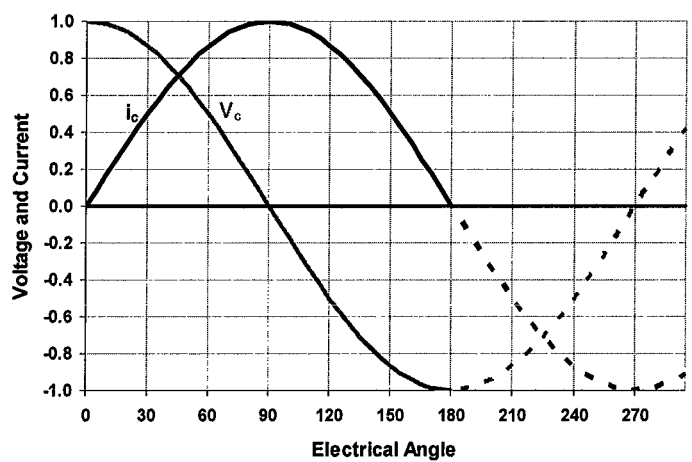
Figure 4:
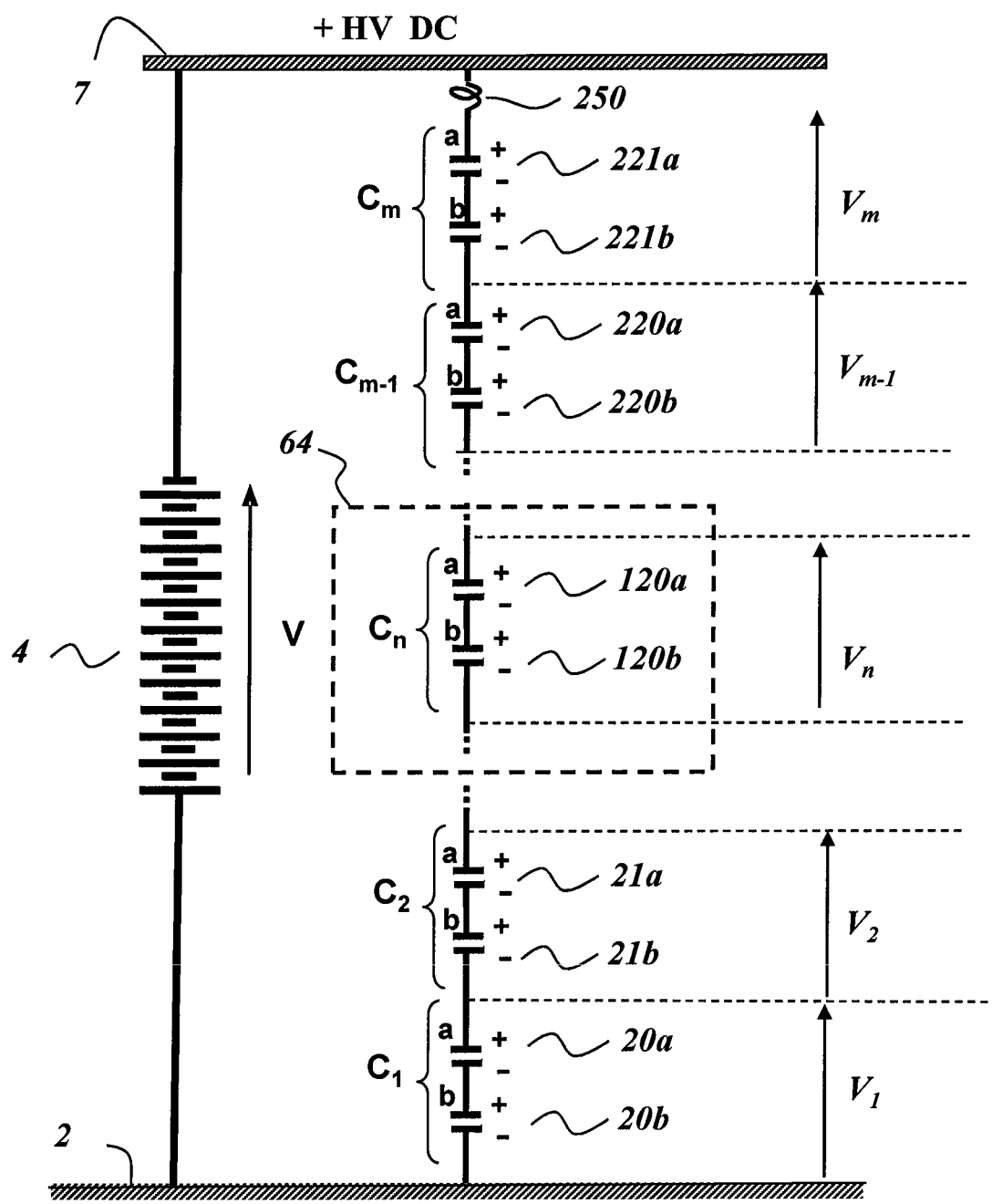
FIG. 4 shows a series of capacitor stages in which each stage consists of two capacitors connected in series.
Figure 5:
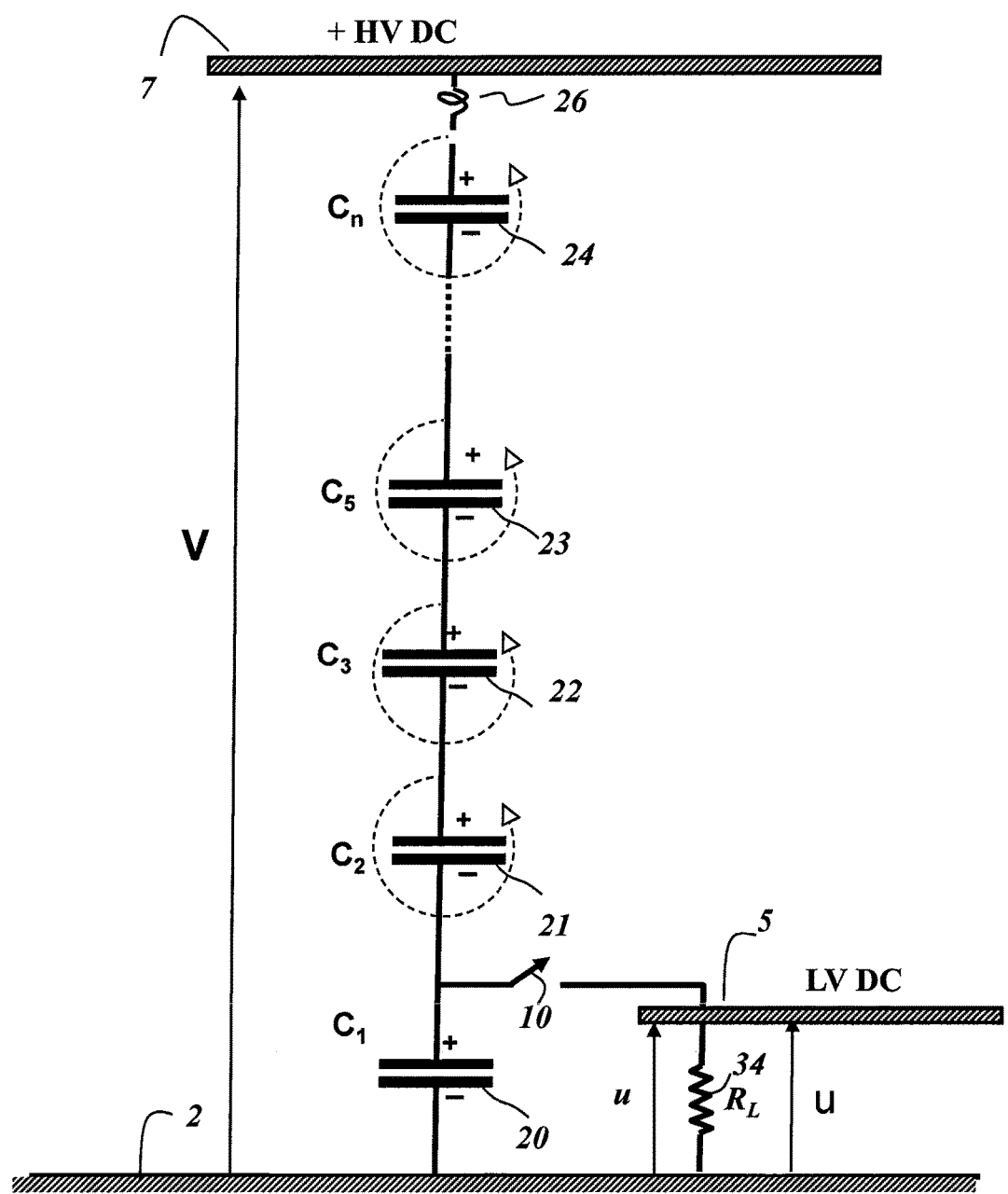
FIG. 5 shows a dc transformer consisting of a series chain of capacitors, the lower most serving as a load capacitor while the others are sequentially reversed in connection polarity.
Figure 9A:
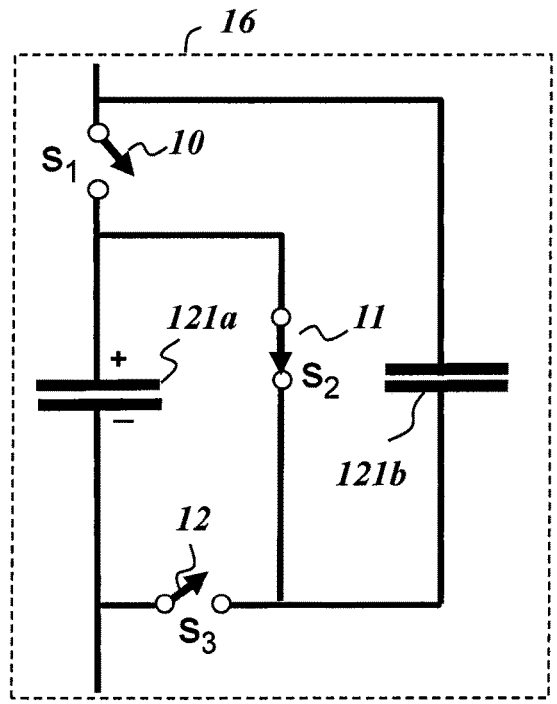
FIG. 9a shows an example schematic by which two capacitors comprising a capacitor module can be connected either in series or parallel.
Figure 9B:
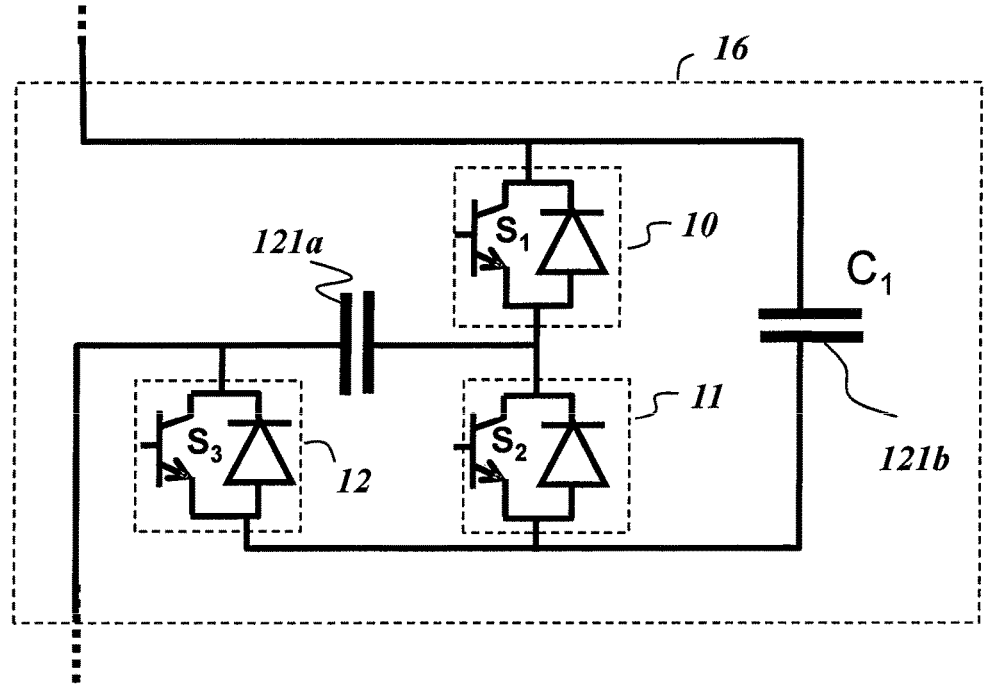
FIG. 9b shows an embodiment of the system of FIG. 9a in which series-to-parallel switching is achieved by a "¾ bridge" comprised of power electronic devices.

FIGS. 3 and 4 showed alternative methods for achieving charge transfer through a series chain of capacitors such as that shown in the dc transformer of FIG. 8-FIG. 3 achieving voltage reversals and FIG. 4 voltage halving. The results illustrated in FIG. 4 can be achieved by means of a "three quarters bridge" illustrated schematically as a module 16 in FIG. 9a and the same module 16 as it could be realized by power electronic devices in FIG. 9b. FIG. 24 is a chart that indicates the switch positions for $S_1$ 10, $S_2$ 11, and $S_3$ 12 for both series and parallel connection with an X for closed and O for open positions respectively.

Figure 10:
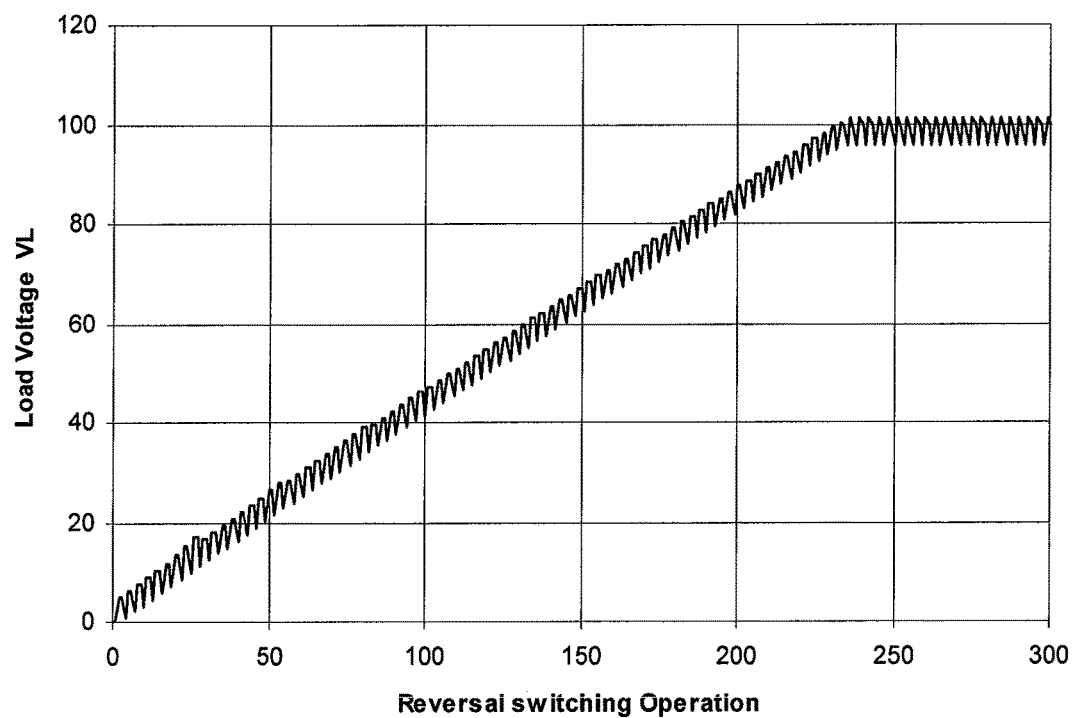
FIG. 10 shows the build-up of load voltage on a dc transformer of the nature of FIG. 8 with successive switching operations.

The embodiment of FIG. 8 using capacitive reversal modules 60 (FIG. 6) was used as the basis for detailed simulation. FIG. 10 shows a load voltage waveform from an Microsoft Excel energy model of an example using the foregoing method in which the initial voltage on the load capacitor $C_L$ 20 in FIG. 8 is zero and no load is connected until the voltage u exceeds a set point $u_0$, after which capacitor voltage reversal timing is adjusted to maintain a close approximation to $u_0$.

Figure 11A:
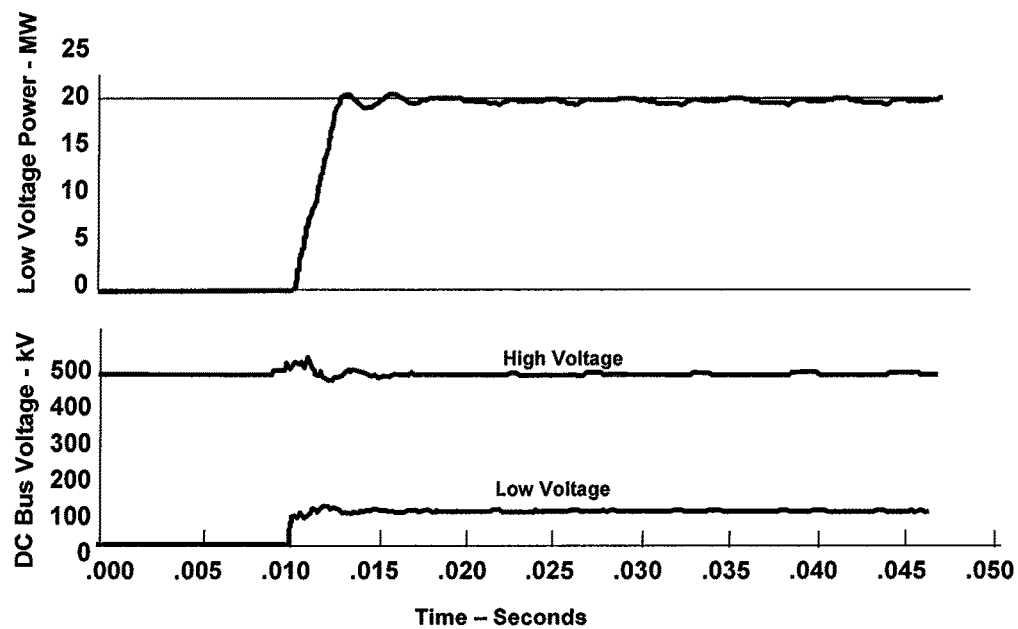
FIG. 11a shows results of a detailed transient simulation of a dc transformer of the nature of FIG. 8 showing build-up of load from zero to 20 MW as well as both ac and dc voltage.
Figure 11B:
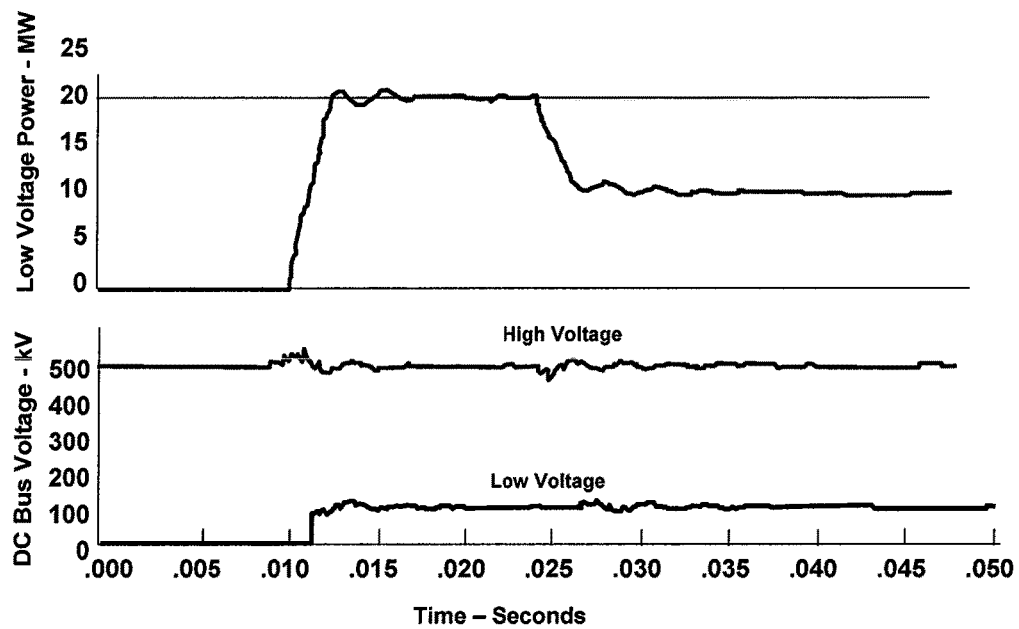
FIG. 11b shows results of a detailed transient simulation of a dc transformer of the nature of FIG. 8 showing reduction of load from 20 MW to 10 MW as well as both ac and dc voltage
Figure 12:
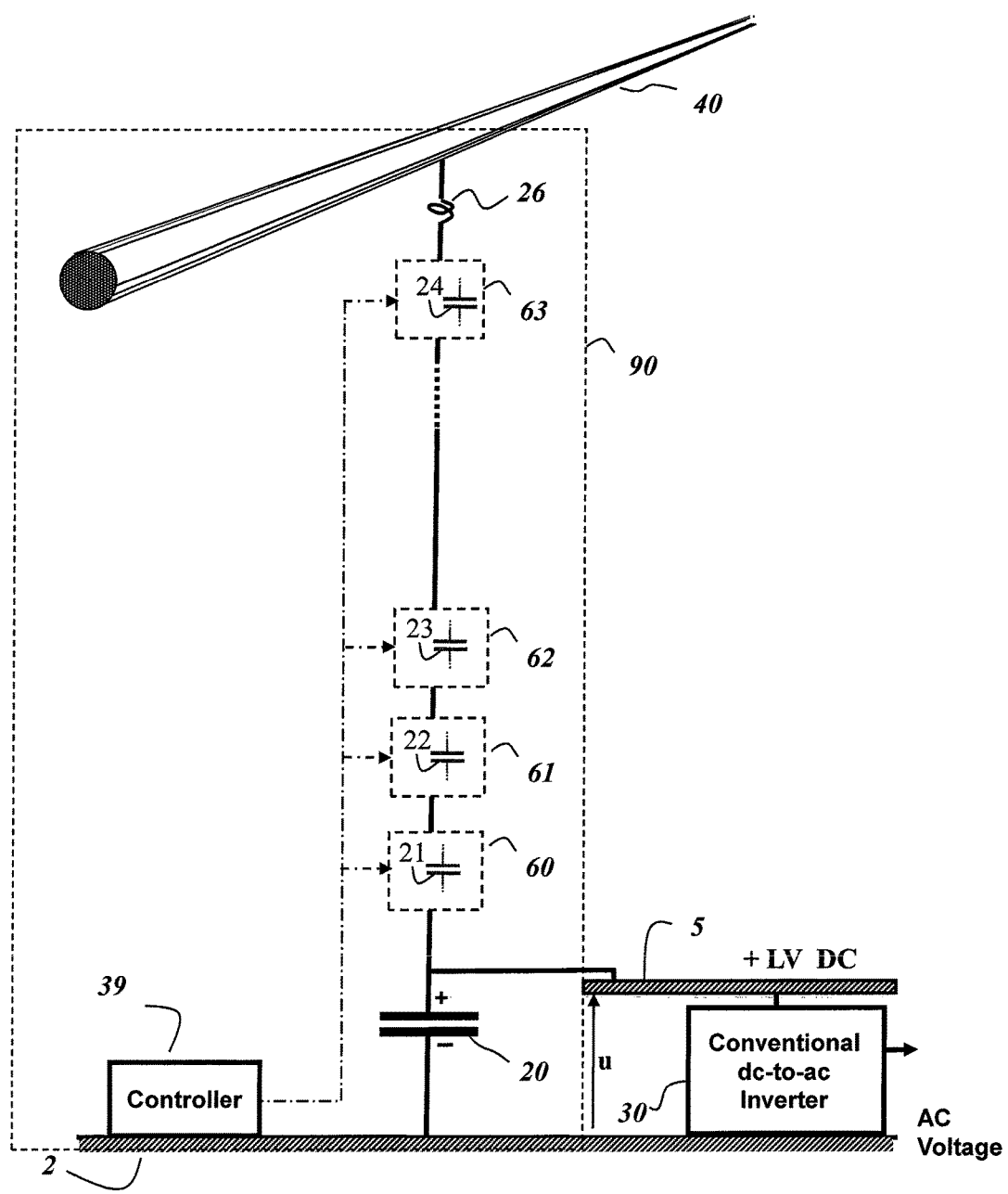
FIG. 12 shows a schematic of a dc transformer of nature of FIG. 8 in the context of an actual transmission line.

FIG. 11a shows detailed transient simulation using a widely recognized digital transient simulator PSCAD (available from The Manitoba HVDC Research Centre of Winnipeg, Manitoba, Calif.) of the system illustrated in FIG. 12 in which the source voltage was represented as an actual dc transmission line fed from a remote source. FIG. 11 a shows, for a 500 kV to 100 kV voltage step-down example, the build-up of load from zero to 20 MW and the voltage on both high and low-voltage busses starting at initial energization. FIG. 11b shows the same system representation but with load reduced from 20 MW to 10 MW.

Figure 13A:
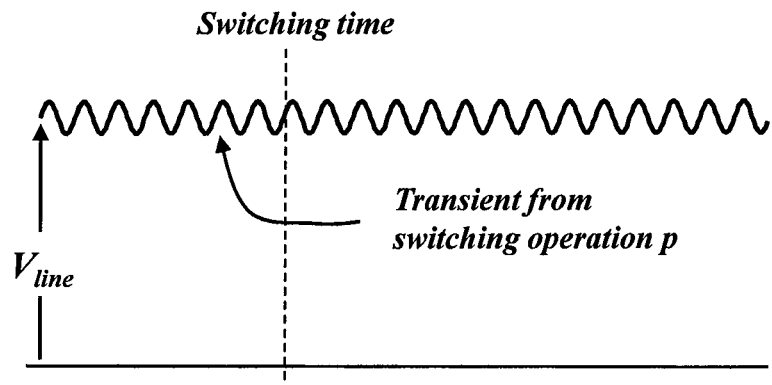
FIG. 13a shows a sinusoidal transient which may occur on the high voltage dc supply bus as a result of switching operations within individual capacitor stages.
Figure 13B:
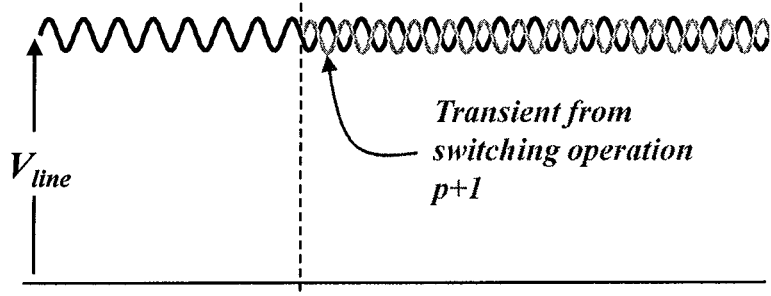
FIG. 13b shows an example switching operation timed to initiate so as to cause an opposing transient voltage on the high voltage dc supply bus.
Figure 13C:
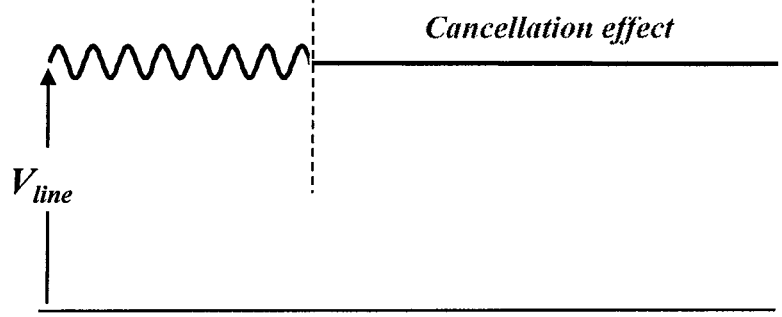
FIG. 13c shows the cancelling effect of two such sinusoidal waves in opposition to one another.

The sequence of switching operations within the DCT will cause a ripple voltage to appear on the high voltage line itself, as illustrated in FIG. 13a, its frequency depending on line length. Since there is control discretion as to the exact timing of each sequential capacitor reversal, each such operation can be timed to cause full or partial cancellation of prior transients. FIG. 13b shows an idealized example switching sequence in which the second operation is timed to cancel the first, resulting in the smoothed waveform shown in FIG. 13c.

It is apparent from both theoretical and simulated representation that the voltage developed on the low voltage bus 5 in FIG. 12 can be controlled over a relatively wide range. The maximum slope of voltage changes achievable on that bus 5 will depend on the rating of capacitors 20 and can be made very high for low capacitance values. Lowering capacitance values does not affect MW rating proportionally since MW rating is proportional to the product of capacitance values and switching frequency and smaller capacitance values allow faster switching. But faster switching is only a partial offset to lower capacitance values since the time required for switching actions becomes important at high switching speeds. Nevertheless it is possible, with appropriate capacitance values to cause the voltage output profile to correspond to a 1-sine ⊖ wave at a frequency of 60 Hz.

Figure 14:
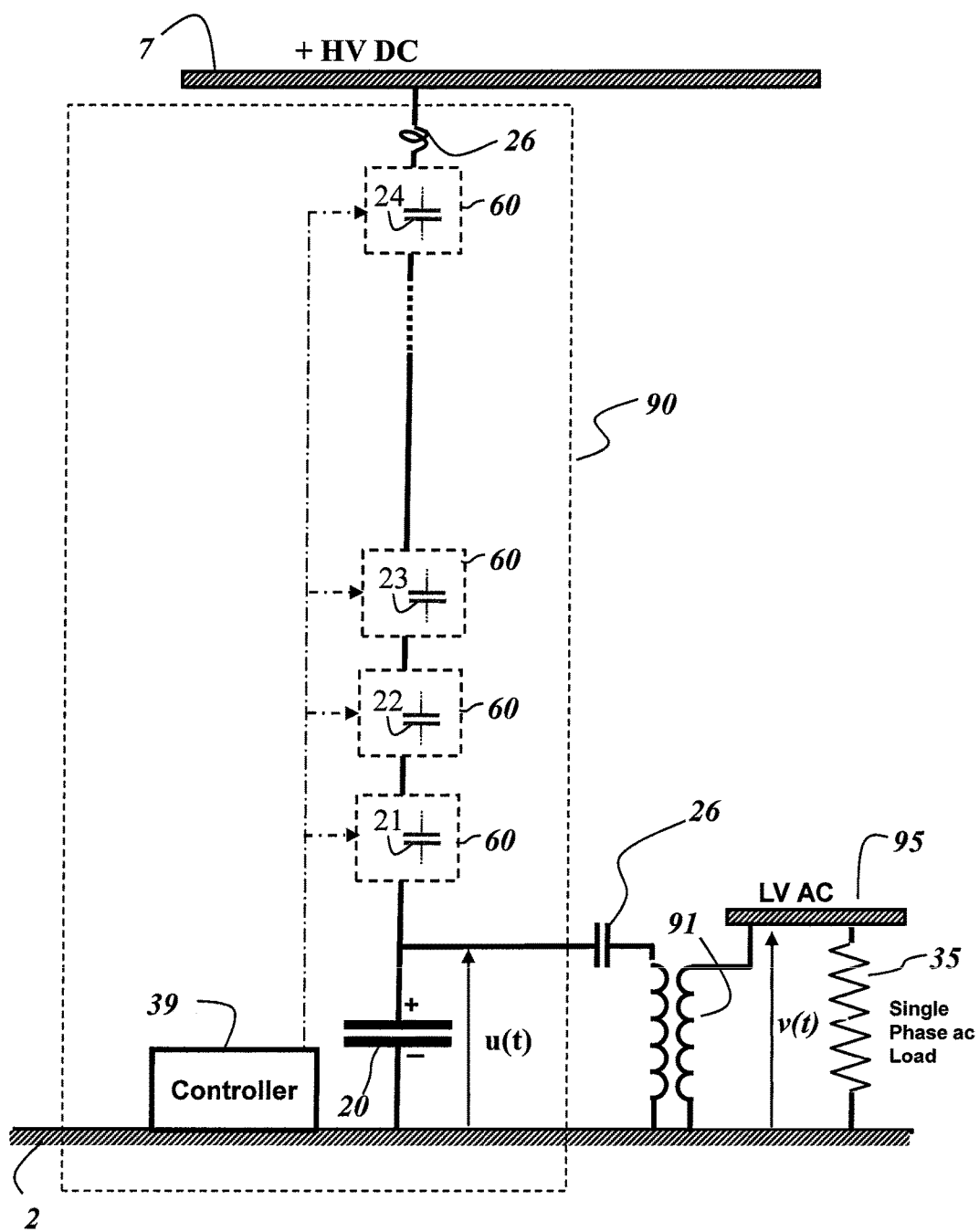
FIG. 14 shows a schematic of the dc transformer illustrated in FIG. 8 adapted for conversion of a high dc voltage to a low single-phase ac voltage.
Figure 15:
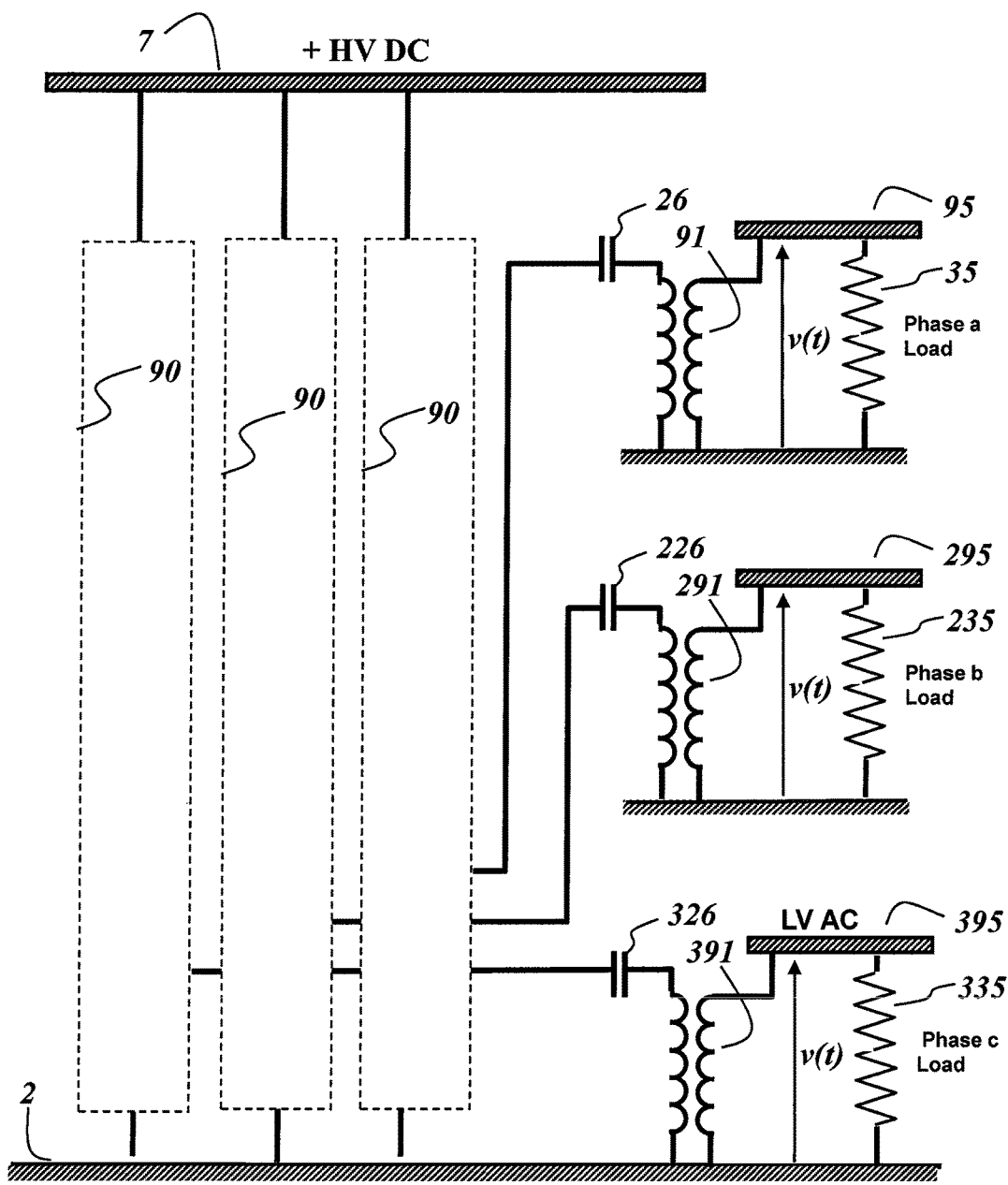
FIG. 15 shows three dc transformers of the nature shown in FIG. 14 connected so as to convert a high dc voltage to low three-phase voltages without a sinusoidal component to the net dc current.

FIG. 14 shows a means by which that voltage wave-form can be converted to a sine ⊖ wave form by means of a dc blocking capacitor 26 and, optionally, a transformer 91. Operation of a DCT in this manner would cause the current drawn from the dc line to also follow a 1-sine ⊖ profile, an intolerable imposition on the dc circuit. But if three DCTs 90 as shown in FIG. 14 were each connected to the same high voltage dc bus 7 as shown in FIG. 15, and each caused to produce a 1-sine ⊖ output with their wave forms displaced by 120 electrical degrees, the sum of the currents drawn from the line would be dc in form, the sinusoidal components adding to zero. In FIG. 15 phase a load 35 is connected to bus 95 that is fed by transformer 91 through blocking capacitor 26. Similarly phase b load 235 is connected to bus 295 that is fed by transformer 291 through blocking capacitor 226. Similarly phase c load 335 is connected to bus 395 that is fed by transformer 391 through blocking capacitor 326.

Figure 16:
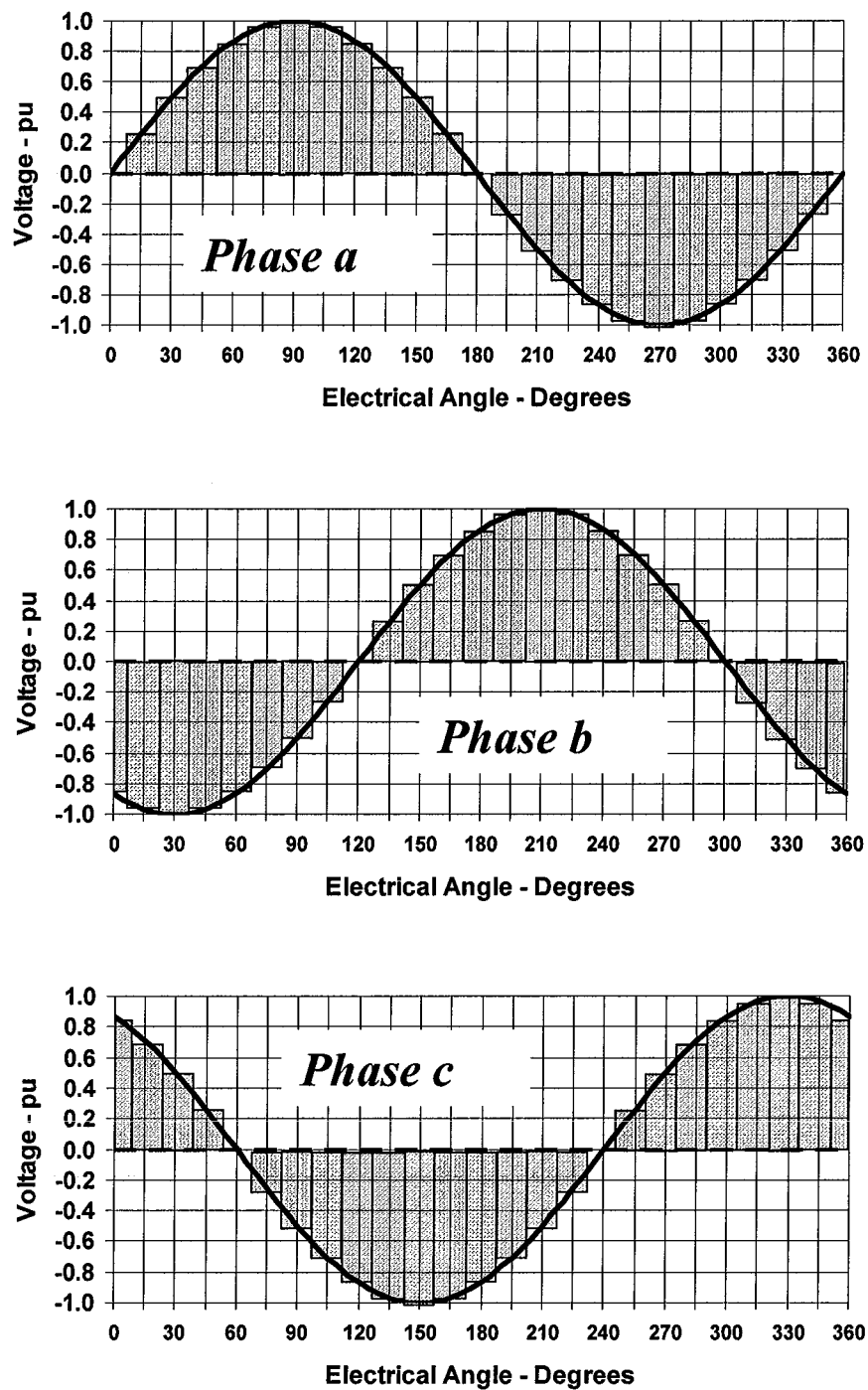
FIG. 16 shows a three-phase ac wave-form represented by an example number of discrete segments.
Figure 17:
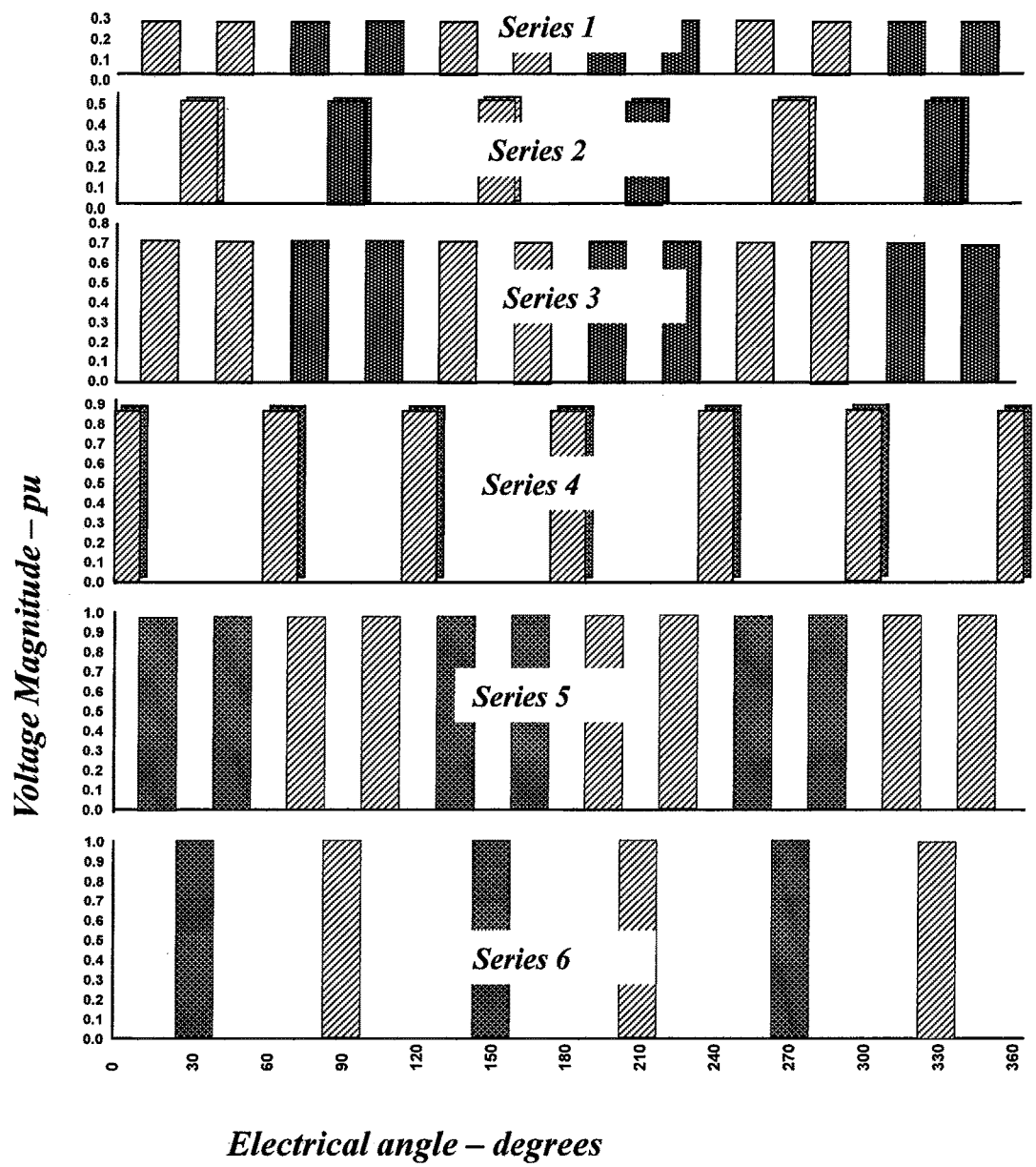
FIG. 17 shows, for the example of FIG. 16, a collection of separate segment requirements for composition of the three phase ac wave-form

An alternative embodiment is capable of approximating low voltage three-phase ac wave forms with a series of positive and negative voltage segments of like magnitude. FIG. 16 shows example segmentation of each wave form comprising three-phase ac. FIG. 17 abstracts those segments, sorts them by voltage magnitude, and shows the demand for each magnitude segment, positive or negative, regardless of the phase where it is required. Several attributes of this series approximation as shown in FIG. 17 are noteworthy.
1. Segments of like magnitude are called for during both positive half-cycles (lightly shaded) and negative half cycles (darkly shaded)
2. Segments in one series may be called on simultaneously by two phases.
3. Segments of the magnitude shown in one series may be called for in both positive and negative portions of the ac sine wave at the same time.

The qualities of segmentation cited above will apply regardless of the number of segments into which the ac wave form is decomposed.

Figure 18:
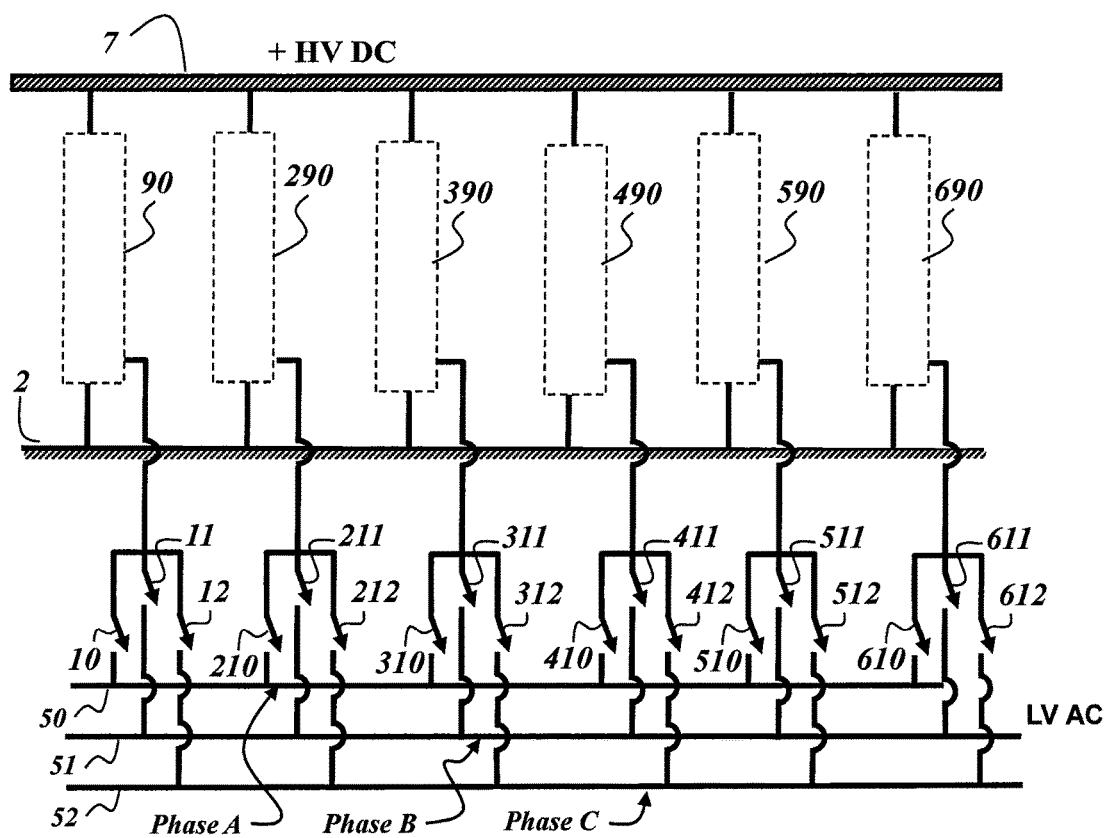
FIG. 18 shows an embodiment in which a number of DCTs may be caused to generate a three phase ac wave form through switching.

While the above method can be used with any dc-to-dc step-down DCT, FIG. 18 shows a specific embodiment of the method using six of the DCTs 90, 290, 390, 490, 590 and 690 described in preceding paragraphs. Each DCT in FIG. 18, 90 through 690, may differ in constants and internal switching time regime depending on the requirements specific to each series. In the example shown each DCT 90 through 690 is connected to each of the three-phase ac busses, 50, 51, and 52, by means of the appropriate switch 10, 11, 12, 210, 211, 212, 310, 311, 312, 410, 411, 412, 510, 511, 512 and 610, 611 and 612 at a time, for a duration, and of a polarity required for its supply of that series magnitude as defined in FIG. 16.

Negative voltage segments required by the system illustrated in the diagram of FIG. 17 can be supplied either through a number of separate and additional DCTs (not shown) connected to the negative high voltage DC bus or by the same DCT that supplies positive segments. In the latter case the load capacitor within each DCT 90 through 690 shown as 20 in FIG. 8 would be embedded in an H-bridge 60 as shown in FIGS. 6a and 6b, or use an alternative voltage reversal method, thereby permitting discharge of the load capacitor at a voltage opposite to that which was its source of charge.

Simultaneous demand for pulses of like magnitude but opposite polarity, as will be demanded by series 4 in FIG. 17, for example, can be supplied by causing the load capacitor 20 (FIG. 8) within that DCT to be comprised of two sub-capacitors in parallel, one of which can be isolated from the other by appropriate switching, then inverted in polarity by an H bridge 60 or other means and supplied to the appropriate phase by a separate set of switches such as 10, 11, and 12. That simultaneous and opposite demand could also be satisfied by extending the discharge time of a time-contiguous segment of like polarity so as to allow it to serve two segments, adjusting its discharge voltage to accommodate two levels.

It is also apparent that, providing a recharging gap exists between discharge demands, one DCT could supply more than one series by alternately generating first one voltage level, then another, e.g., series 2 and series 4 or series 4 and series 6 in FIG. 17, series 4 and 6 being very nearly equal anyway.

It will be apparent to those skilled in the art that increasing the number of series and the number of DCTs will smooth both the high voltage and low voltage wave forms. Other means can also serve that objective. For ease of illustration, equal time steps of 15 electrical degrees each were chosen in FIG. 17 and the examples based on that figure. However the time duration of various voltage segments may differ from one another and should be optimized to best accommodate charge and discharge requirements and to limit the number of DCTs required.

In the DCT embodiment described above and a segmentation pattern such as that shown in FIG. 17, charging of load capacitors 20 within each module 90 through 690 and for each magnitude segment, can be achieved while that segment is idle—thus avoiding the need for charging time to interrupt the energy transfer cycle. More importantly the time available for charging is an order of magnitude greater with the embodiment of FIG. 18 than with that of FIG. 15 since the gap between demands on any particular segment of FIG. 17 will, for reasonable segment selection, be in the order of substantial fractions of 1 millisecond.

Figure 19A:
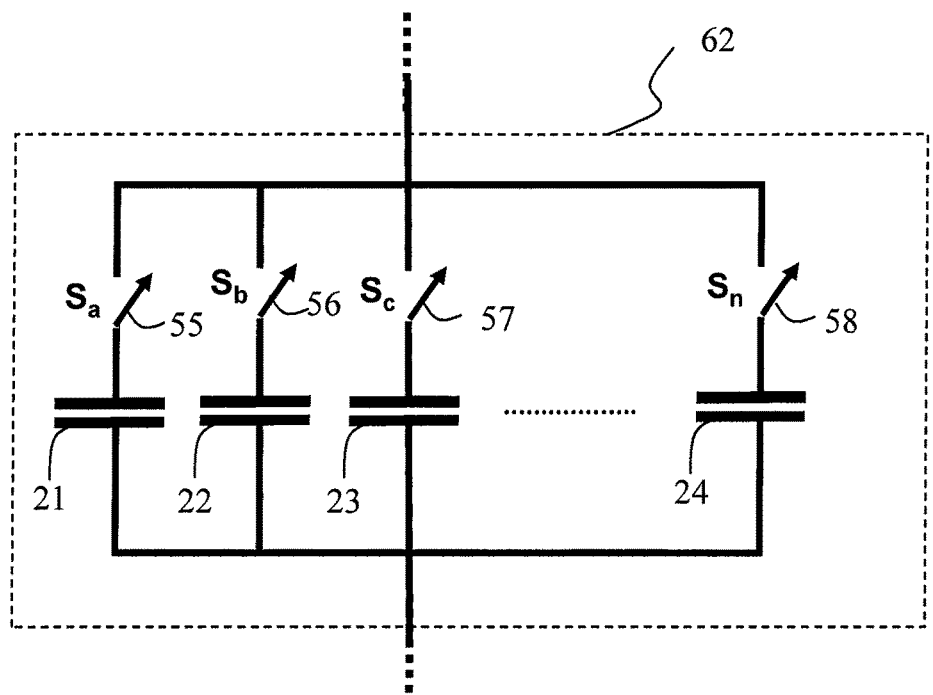
FIG. 19a shows a schematic of a parallel method by which individual capacitors can be charged or discharged in any prescribed combination.
Figure 19B:
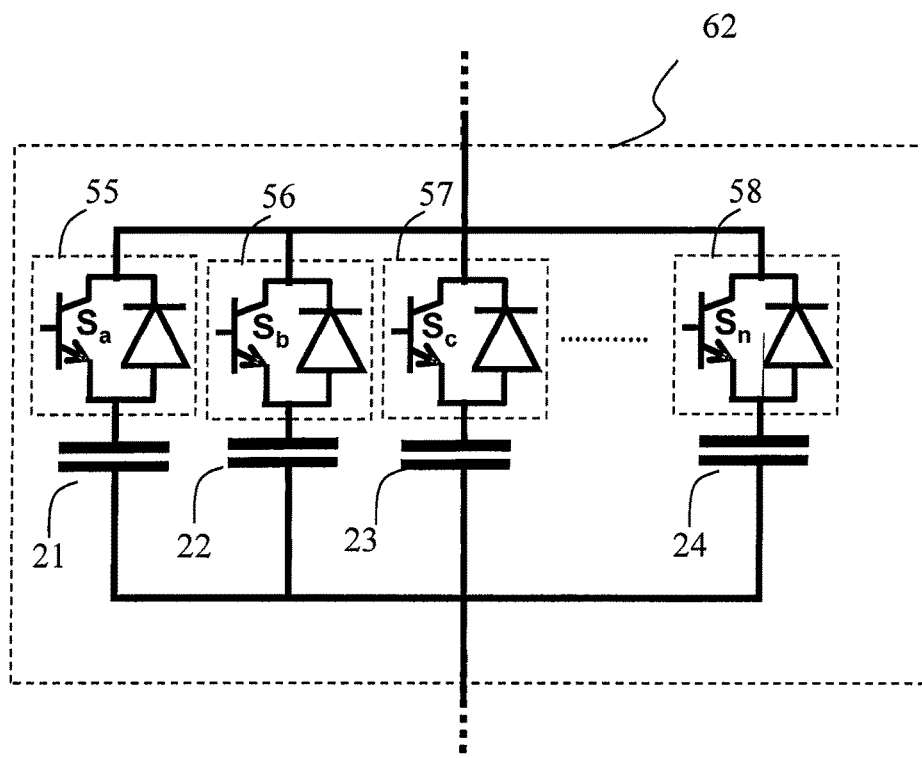
FIG. 19b shows how the schematic of FIG. 19a can be realized with power electronic devices.

Increasing the number of segments comprising the sine θ wave, with a corresponding increase in the number of DCTs, will allow it to be more accurately replicated, lowering the filter requirements, thus reducing filtering requirements on both the dc bus 7 and ac busses 50, 51, and 52 in FIG. 18. That objective can also be served by causing the load capacitor 20 (FIG. 14) to be comprised of multiple of subcapacitors as shown in FIG. 19a in schematic switching format and in FIG. 19b as an example implementation with power electronic devices. The size of individual capacitors 21 through 24 in FIGS. 19a and 19b and the sequence of both their charging and discharging can govern the net charge and discharge current profiles within the fundamental embodiment described in FIG. 18. Switches 55-58 are shown in FIG. 19b and can be IGBTs.

Figure 20:
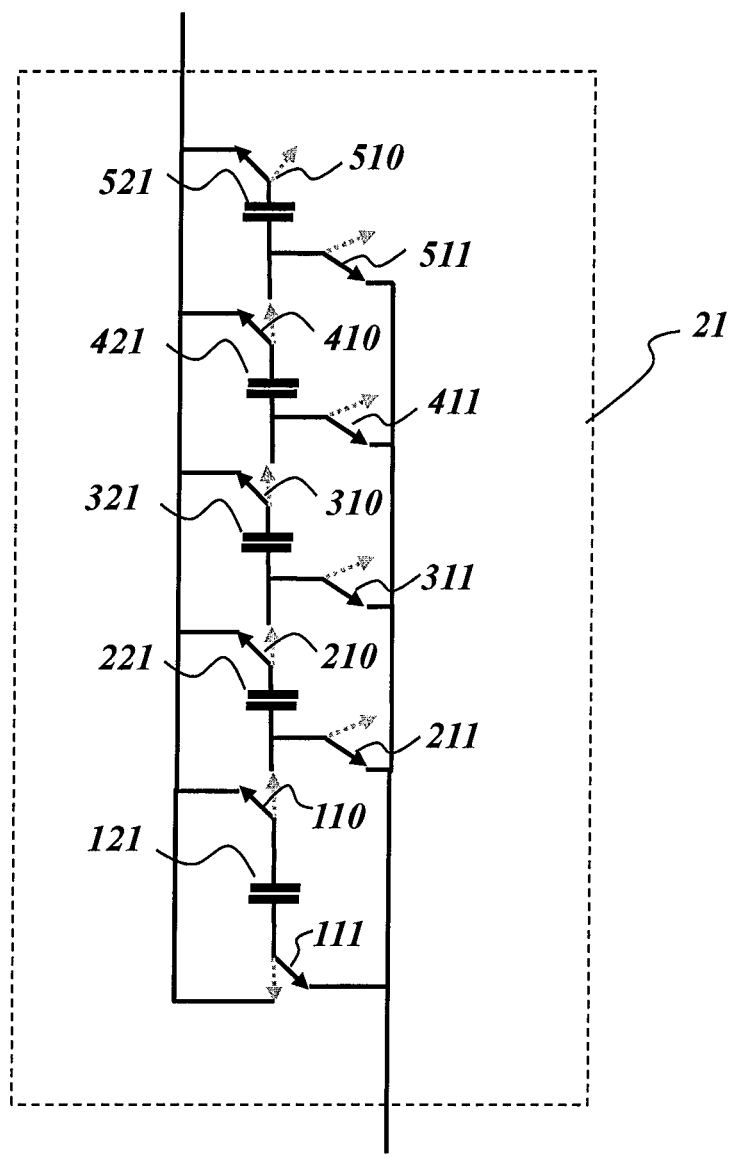
FIG. 20 shows a system by which a number of capacitors can be charged or discharged sequentially and in series when desired, others being bypassed.

In like manner and for the same purpose subcapacitors 21 through 24 may be subdivided into series segments 121, 221, 321, 421 and 521 in the manner shown in FIG. 20 in which each series element 121 through 521 may be of different value. It will be seen from FIG. 20 that capacitors 121 through 521 can be charged sequentially by causing all switches 110 and 111, 210 and 211, 310 and 311, 410 and 411, and 510 and 511 to isolate and bypass all capacitors 121 through 521 except the one being charged, that procedure being used to charge each capacitor 121 through 521 in turn. Capacitors 121 through 521 may likewise be discharged sequentially or in series combinations to control the discharge current profile to better match the sinusoidal wave form being emulated and/or the profile of charging current requirement.

Figure 21A:
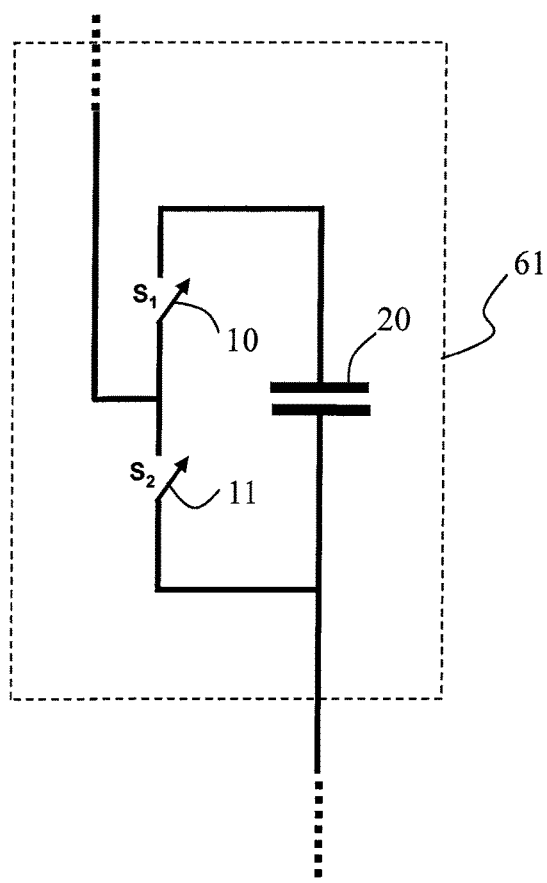
FIG. 21a shows a schematic which allows capacitors to be charged or discharged or, alternatively, isolated and bypassed.
Figure 21B:
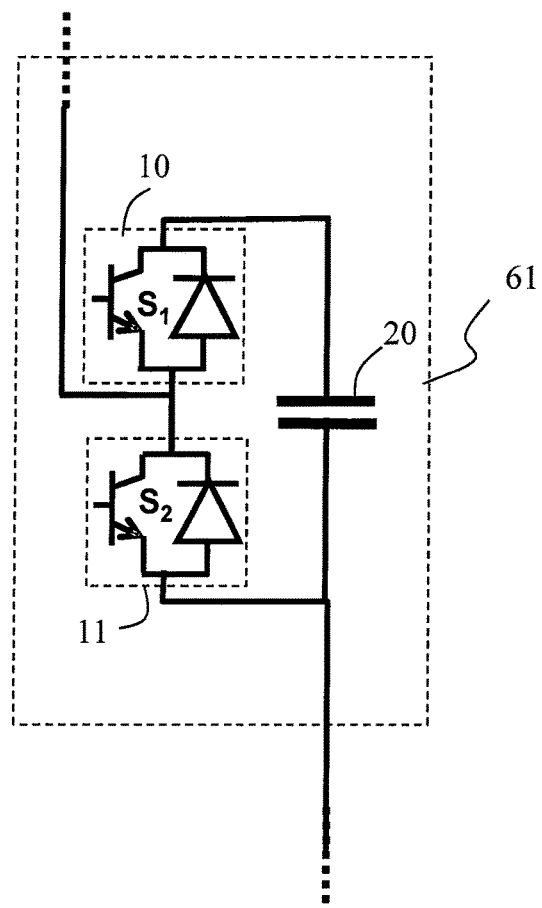
FIG. 21b shows how the functions achieved by the schematic of FIG. 21a can be realized in a "half bridge" by means of power electronics devices.

One means for achieving the switching operations called for in FIG. 20 for sequential charge and discharge operations is illustrated in FIG. 21a in schematic format and in 21b as that function might be achieved by a "half bridge" comprised of power electronic devices.

Figure 22:
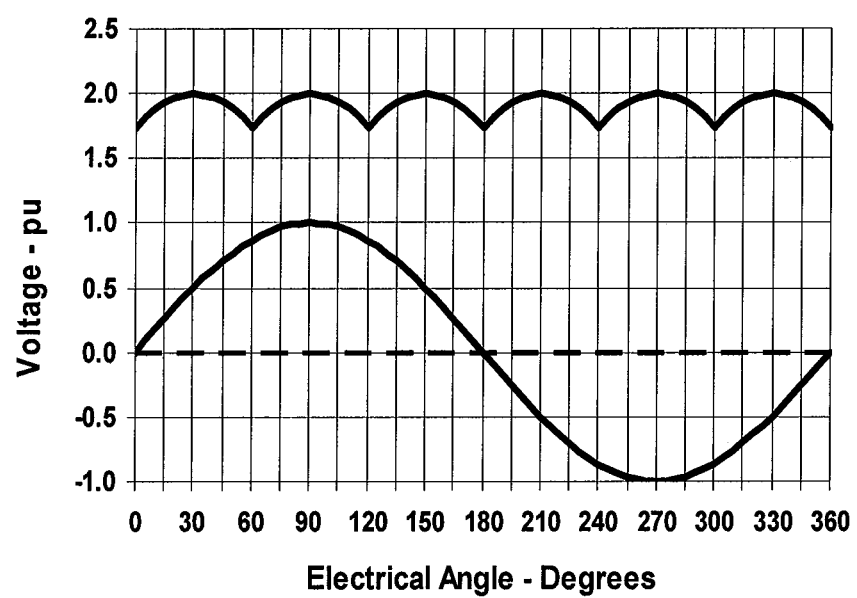
FIG. 22 shows the character of the dc current wave form resulting from generation of three phase ac according to the disclosure.

The current wave form seen by the dc bus 7 in FIG. 18 as a result of generating the three phase wave as form described above will resemble the wave form illustrated in FIG. 22 which also characterizes the dc current wave form resulting from use of a conventional six-pulse Graetz bridge to convert dc to ac. The sixth harmonic content will, in both cases, require filters to limit harmonic current on the connected dc transmission line.

Conventional present day ac-to-dc and dc-to-ac conversion stations reduce the filtering challenge by arraying a duplicate conversion regime, adding its output to the first, such that the three-phase ac wave forms characterizing the second of them is offset by sixty electrical degrees from the ac wave forms characterizing the first. The primary ripple resulting from this "twelve pulse" bridge is a twelfth harmonic which is of lower magnitude than the sixth shown in FIG. 22. The same recourse may be applied to the dc transformer disclosed herein. The configuration illustrated in FIG. 18 may be duplicated, each of its wave forms being offset by sixty electrical degrees from the first. The output of each phase of the second set of dc transformers would then be added to the output of the corresponding phase of the first set of dc transformers either by direct electrical addition or by causing the output of each to supply a separate primary winding of a common transformer such that the two ac voltage wave forms for each phase are additive on the secondary. In like manner additional duplicates of the configuration shown in FIG. 18 may be used, each with its offset adjusted to further reduce the harmonic content of the dc supply Embodiments of this disclosure which limit actions within each stage to a sequence consisting of one or more capacitor reversals aid in its implementation inasmuch as a number of modern commercially available high voltage valves now used in power and reactive power controllers, already consist of capacitor stages capable of being reversed by external controls. This disclosure represents a new method for use of such valves, i.e. one which achieves dc-to-dc conversion.

What is claimed is:

1. A high voltage transformation system for transforming electric power from a high voltage direct current source to a lower voltage direct current output or to a lower voltage alternating current (ac) without intermediate magnetic transformation, they system comprising:
a plurality of transformers, each transformer comprising a plurality of stages, wherein each stage comprises one or more capacitors, and one or more switching devices; and a controller that controls the switching devices to change the polarity of a plurality of the capacitors; wherein the controller causes a plurality of the capacitors to be charged in series at the high voltage and then causes a plurality of the capacitors to be separately reversed in polarity; and wherein the lower voltage output is caused to vary in time, describing a 1-sine ⊖ current wave shape;
wherein a number of the transformers, the number being an integer multiple of three, are connected in parallel and caused to generate 1-sine ⊖ current wave shapes which, by virtue of displacement of their relative electrical phase position, draw from the high voltage dc source an aggregate current which has essentially no sinusoidal content.

2. The high voltage transformation system of claim 1, wherein each transformer further comprises one or more voltage reversing reactors.

3. The high voltage transformation system of claim 1 wherein the controller causes a series of autonomous actions within individual stages so as to transform power from a high voltage direct current source to a lower voltage direct current load or time-varying current load.

4. The high voltage transformation system of claim 3 wherein the series of autonomous actions comprises switching actions, and wherein the controller causes the switching action within individual stages to be initiated at a time which causes the effect of that switching action to reduce a transient caused by one or more prior switching actions.

5. The high voltage transformation system of claim 3 wherein power from a high voltage direct current source is transformed to a lower voltage direct current load or time-varying current load, wherein during such transformation the voltage within each stage does not exceed a predetermined increase over a nominal and proportionate voltage rating of that stage compared to the sum of voltages for all stages.

6. The high voltage transformation system of claim 3 wherein the high voltage direct current source has a potential, and wherein a voltage rating of each stage is a fraction of the potential of the high voltage direct current source.

7. The high voltage transformation system of claim 1 wherein the switching devices comprise power electronic switching apparatus within each stage, to temporarily disconnect one or more capacitors and reconnect them in a reverse polarity.

8. The high voltage transformation system of claim 7 wherein capacitor reversal is achieved using an H bridge comprised of power electronic devices.

9. The high voltage transformation system of claim 1 wherein the controller causes a sequence of switching by the switching devices, and wherein the sequence of switching is selected to cause a recurrent increase in a load capacitor above its nominal voltage, thus enabling repetitive discharge of that capacitor into an electrical load.

10. The high voltage transformation system of claim 1 wherein the time of switching of an individual capacitor is adjusted to cancel the harmonic oscillation caused by one or more prior switching actions.

11. The high voltage transformation system of claim 1 wherein one or more stages comprise multiple capacitors, to allow partial and sequential charging and/or discharging of the stages.

12. The high voltage transformation system of claim 11 wherein one or more stages comprises multiple capacitors in parallel, each such capacitor switched into charging or discharging duty at a time and for a duration that controls the aggregate charging or discharging current profile.

13. The high voltage transformation system of claim 11 wherein one or more stages comprises multiple capacitors in series, each such capacitor either inserted in the series chain or isolated from that chain and bypassed within the chain, thereby controlling the number of capacitors in the series chain at times and for durations that control the aggregate charging or discharging current profile.

14. The high voltage transformation system of claim 13 wherein control of insertion or bypassing is achieved by a three-quarters bridge comprised of three power electronic devices.

15. The high voltage transformation system of claim 1 wherein the sine $\ominus$ component and the dc component of the 1-sine $\ominus$ current and voltage wave shapes are separated from one another by use of a blocking capacitor or network serving the blocking function, thus isolating the ac component and allowing its supply to an ac bus bar either directly or through an intermediate magnetically-based transformer.

16. A high voltage transformation system for transforming electric power from a high voltage direct current source to a lower voltage direct current output or to a lower voltage alternating current (ac) output without intermediate magnetic transformation, the system comprising:
- a plurality of transformers, each transformer comprising a plurality of stages, wherein each stage comprises one or more capacitors, and one or more switching devices; and a controller that controls the switching devices to change the polarity of a plurality of the capacitors; wherein the controller causes a plurality of the capacitors to be charged in series at the high voltage and then causes a plurality of the capacitors to be separately reversed in polarity;
- wherein each transformer supplies at least one separate portion of a sinusoidal ac waveform; and
- wherein a transformer is enabled to supply at least one portion of a sinusoidal ac waveform of opposite polarity by causing a capacitor or a fraction of a number of capacitors connected so as to comprise a composite capacitor, to be charged at a first polarity; then have its polarity temporarily reversed by switching actions for supply of power at a second polarity.

17. A high voltage transformation system for transforming electric power from a high voltage direct current source to a lower voltage direct current output or to a lower voltage alternating current (ac) output without intermediate magnetic transformation, the system comprising:
- a plurality of transformers, each transformer comprising a plurality of stages, wherein each stage comprises one or more capacitors, and one or more switching devices; and a controller that controls the switching devices to change the polarity of a plurality of the capacitors; wherein the controller causes a plurality of the capacitors to be charged in series at the high voltage and then causes a plurality of the capacitors to be separately reversed in polarity;
- wherein each transformer supplies at least one separate portion of a sinusoidal ac waveform; and
- wherein one transformer is caused to supply more than one portion, by adjusting its voltage level between the demands of a plurality of portions.

18. A high voltage transformation system for transforming electric power from a high voltage direct current source to a lower voltage direct current output or to a lower voltage alternating current (ac) output without intermediate magnetic transformation, the system comprising:
- a plurality of transformers, each transformer comprising a plurality of stages, wherein each stage comprises one or more capacitors, and one or more switching devices; and a controller that controls the switching devices to change the polarity of a plurality of the capacitors; wherein the controller causes a plurality of the capacitors to be charged in series at the high voltage and then causes a plurality of the capacitors to be separately reversed in polarity;
- wherein each transformer supplies at least one separate portion of a sinusoidal ac waveform; and
- wherein, by varying the time duration of various portions as well as their time-orientation on a sinusoidal ac wave form, the composite charging wave form is adjusted to smooth the charging demands on the dc supply source and/or to replicate the ac sine wave segment supplied during the discharge interval.

19. A high voltage transformation system for transforming electric power from a high voltage direct current source to a lower voltage direct current output or to a lower voltage alternating current (ac) output without intermediate magnetic transformation, the system transformer comprising:
- n sets of transformers, each transformer comprising a plurality of stages, wherein each stage comprises one or more capacitors, and one or more switching devices; and a controller that controls the switching devices to change the polarity of a plurality of the capacitors; wherein the controller causes a plurality of the capacitors to be charged in series at the high voltage and then causes a plurality of the capacitors to be separately reversed in polarity;
- wherein each transformer supplies at least one separate portion of a sinusoidal ac waveform; and
- wherein the waveforms of each set are offset by 120/n electrical degrees, wherein the transformers are arrayed to cause the ac outputs of each set to be added to that of all others on a phase-by-phase basis.

* * * * *